US009133839B2

(12) United States Patent
Rampen et al.

(10) Patent No.: US 9,133,839 B2
(45) Date of Patent: Sep. 15, 2015

(54) FLUID-WORKING MACHINE AND METHOD OF DETECTING A FAULT

(75) Inventors: William Hugh Salvin Rampen, Edinburgh (GB); Niall James Caldwell, Edinburgh (GB); Michael Richard Fielding, Linlithgow (GB); Stephen Michael Laird, Edinburgh (GB); Uwe Bernhard Pascal Stein, Edinburgh (GB); John Tearlach Campbell, Edinburgh (GB)

(73) Assignee: ARTEMIS INTELLIGENT POWER LIMITED, Loanhead (GB)

( * ) Notice: Subject to any disclaimer, the term of this patent is extended or adjusted under 35 U.S.C. 154(b) by 144 days.

(21) Appl. No.: 13/320,677

(22) PCT Filed: Feb. 23, 2011

(86) PCT No.: PCT/GB2011/050359

§ 371 (c)(1), (2), (4) Date: Nov. 15, 2011

(87) PCT Pub. No.: WO2011/104548

PCT Pub. Date: Sep. 1, 2011

(65) Prior Publication Data

US 2012/0057991 A1 Mar. 8, 2012

(30) Foreign Application Priority Data

Feb. 23, 2010 (GB) .................................. 1002999.9
Feb. 23, 2010 (GB) .................................. 1003005.4

(51) Int. Cl.
*F04B 51/00* (2006.01)
*G06F 19/00* (2011.01)

(Continued)

(52) U.S. Cl.
CPC ............... *F04B 51/00* (2013.01); *F04B 7/0076* (2013.01); *F04B 49/24* (2013.01); *F04B 53/1082* (2013.01); *G06F 19/00* (2013.01)

(58) Field of Classification Search
USPC ............... 417/53, 213, 216, 426; 702/64, 114
See application file for complete search history.

(56) References Cited

U.S. PATENT DOCUMENTS 3,928,968 A 12/1975 Becker et al.
4,496,846 A 1/1985 Parkins (Continued)

FOREIGN PATENT DOCUMENTS

CN 2849495 Y 12/2006
DE 2916490 11/1980

(Continued)

OTHER PUBLICATIONS

W.H.S. Rampen, et al., "Constant Pressure Control of the Digital Displacement Hydraulic Piston Pump", Fourth Bath International Fluid Power Workshop, Bath, Sep. 18-20, 1991.

*Primary Examiner* — Charles Freay
*Assistant Examiner* — Kenneth J Hansen
(74) *Attorney, Agent, or Firm* — Lowe Hauptman & Ham, LLP

(57) ABSTRACT

In a method of detecting a fault in a fluid-working machine including a plurality of working chambers of cyclically varying volume, each working chamber is operable to displace a volume of working fluid which is selectable for each cycle of working chamber volume to carry out a working function responsive to a received demand signal. An output parameter of the fluid working machine, which is responsive to the displacement of working fluid by one or more of the working chambers to carry out the working function, is measured. It is determined whether the measured output parameter fulfils at least one acceptable function criterion, taking into account the previously selected net displacement of working fluid by a working chamber during a cycle of working chamber volume to carry out the working function.

25 Claims, 8 Drawing Sheets

(51) Int. Cl.

| | |
|---|---|
| ***F04B 49/24*** | (2006.01) |
| ***F04B 7/00*** | (2006.01) |
| ***F04B 53/10*** | (2006.01) |

(56) References Cited

U.S. PATENT DOCUMENTS

| | | | | |
|---|---|---|---|---|
| 4,496,847 | A | | 1/1985 | Parkins |
| 4,556,026 | A | | 12/1985 | Masuda et al. |
| 4,606,312 | A | | 8/1986 | Fujii et al. |
| 4,965,513 | A | | 10/1990 | Eissenberg et al. |
| 5,190,446 | A | | 3/1993 | Rampen et al. |
| 5,201,294 | A | | 4/1993 | Osuka |
| 5,259,738 | A | | 11/1993 | Rampen et al. |
| 5,263,365 | A | | 11/1993 | Kantschar et al. |
| 5,439,355 | A | | 8/1995 | Barker et al. |
| 5,445,019 | A | | 8/1995 | Chui et al. |
| 5,456,581 | A | | 10/1995 | Jokela et al. |
| 5,492,099 | A | | 2/1996 | Maddock et al. |
| 5,564,391 | A | | 10/1996 | Barnes et al. |
| 5,584,266 | A | | 12/1996 | Ishigami et al. |
| 5,657,681 | A | | 8/1997 | Henricson |
| 5,711,273 | A | | 1/1998 | Barnes et al. |
| 5,723,780 | A | | 3/1998 | Miwa et al. |
| 5,737,994 | A | | 4/1998 | Escobosa |
| 5,773,716 | A | | 6/1998 | Antonioli et al. |
| 5,954,032 | A | | 9/1999 | Augustin et al. |
| 6,055,851 | A | * | 5/2000 | Tanaka et al. .................... 73/46 |
| 6,092,370 | A | * | 7/2000 | Tremoulet et al. .............. 60/328 |
| 6,293,251 | B1 | | 9/2001 | Hemmerlein et al. |
| 6,474,292 | B1 | | 11/2002 | Frenz et al. |
| 6,478,547 | B1 | | 11/2002 | Savard et al. |
| 6,829,542 | B1 | | 12/2004 | Reynolds et al. |
| 2001/0032031 | A1 | | 10/2001 | Ufheil et al. |
| 2002/0062682 | A1 | | 5/2002 | Kumpfmueller |
| 2003/0144818 | A1 | | 7/2003 | Kasuya et al. |
| 2004/0158419 | A1 | * | 8/2004 | Pearson et al. .................. 702/64 |
| 2004/0226346 | A1 | | 11/2004 | Benken et al. |
| 2004/0231348 | A1 | | 11/2004 | Kawaguchi et al. |
| 2005/0118033 | A1 | | 6/2005 | Schneider |
| 2005/0238503 | A1 | | 10/2005 | Rush et al. |
| 2005/0257618 | A1 | | 11/2005 | Boken |
| 2006/0039795 | A1 | | 2/2006 | Stein et al. |
| 2007/0227345 | A1 | | 10/2007 | Martinez |
| 2007/0258832 | A1 | * | 11/2007 | Caldwell et al. .............. 417/315 |
| 2008/0009950 | A1 | | 1/2008 | Rampen et al. |
| 2008/0015806 | A1 | | 1/2008 | Stegmann et al. |
| 2008/0121290 | A1 | | 5/2008 | Outka et al. |
| 2008/0190176 | A1 | | 8/2008 | Muller et al. |
| 2008/0249699 | A1 | | 10/2008 | Wolber et al. |
| 2009/0101101 | A1 | | 4/2009 | Iwamoto |
| 2009/0210120 | A1 | | 8/2009 | Stein et al. |
| 2009/0229455 | A1 | | 9/2009 | Eichner |
| 2010/0183448 | A1 | | 7/2010 | Leugemors et al. |
| 2010/0186402 | A1 | | 7/2010 | Ariga et al. |
| 2010/0303638 | A1 | | 12/2010 | Kuttler et al. |
| 2010/0303657 | A1 | | 12/2010 | Kuttler et al. |
| 2011/0123354 | A1 | | 5/2011 | Stein et al. |
| 2011/0226342 | A1 | | 9/2011 | Stein et al. |
| 2011/0268590 | A1 | | 11/2011 | Stein et al. |

FOREIGN PATENT DOCUMENTS

| | | | | | |
|---|---|---|---|---|---|
| DE | 3244738 | | | 6/1984 | |
| DE | 19625947 | | | 9/1997 | |
| DE | 19947570 | | | 4/2001 | |
| DE | 10334817 | | | 10/2005 | |
| EP | 0361927 | | | 9/1989 | |
| EP | 0471098 | A1 | | 2/1992 | |
| EP | 0494236 | | | 12/1995 | |
| EP | 0 928 849 | A2 | | 7/1999 | |
| EP | 1319835 | A2 | | 6/2003 | |
| EP | 1319836 | | | 6/2003 | |
| EP | 1537333 | | | 6/2006 | |
| EP | 1674365 | | | 6/2006 | |
| EP | 2055943 | | | 5/2009 | |
| EP | 2055945 | | | 5/2009 | |
| EP | 2055946 | | | 5/2009 | |
| EP | 2055947 | | | 5/2009 | |
| GB | 2070199 | | | 12/1980 | |
| GB | 2314412 | | | 6/1996 | |
| GB | 2459520 | | | 6/2008 | |
| GB | 2459520 | A | * | 10/2009 | ............. F04B 53/10 |
| JP | 52-144568 | | | 12/1977 | |
| JP | 62-20681 | | | 1/1987 | |
| JP | 6108976 | | | 4/1994 | |
| JP | 10-54371 | | | 2/1998 | |
| JP | 11117875 | | | 4/1999 | |
| JP | 2002041143 | | | 2/2002 | |
| JP | 2002-242849 | A | | 8/2002 | |
| JP | 2003314460 | | | 11/2003 | |
| JP | 2007092582 | | | 4/2007 | |
| JP | 2007-534886 | | | 11/2007 | |
| KR | 20000046874 | | | 7/2000 | |
| RU | 2344320 | C1 | | 1/2009 | |
| WO | 9105163 | | | 4/1991 | |
| WO | 2004/025122 | | | 3/2004 | |
| WO | 2004025122 | | | 3/2004 | |
| WO | 2005095800 | | | 10/2005 | |
| WO | 2007068447 | | | 6/2007 | |
| WO | 2007082637 | | | 7/2007 | |
| WO | 2007088380 | | | 8/2007 | |
| WO | 2007099057 | | | 9/2007 | |
| WO | 2008009950 | | | 1/2008 | |
| WO | 2008012587 | | | 1/2008 | |
| WO | 2008025413 | | | 3/2008 | |
| WO | 2008046544 | | | 4/2008 | |
| WO | 2009153605 | | | 12/2009 | |
| WO | 2012-031066 | | | 5/2012 | |
| WO | 2012141623 | | | 10/2012 | |

* cited by examiner

| 204 | 205 | 206 | 201 | ΔP |
|---|---|---|---|---|
| 0 | 0 | 0 | 0 | x1 |
| 0 | 0 | 0 | 1 | y1 |
| 0 | 0 | 1 | 0 | x2 |
| 0 | 0 | 1 | 1 | y2 |
| 0 | 1 | 0 | 0 | x3 |
| 0 | 1 | 0 | 1 | y3 |
| 0 | 1 | 1 | 0 | x4 |
| 0 | 1 | 1 | 1 | y4 |
| 1 | 0 | 0 | 0 | x5 |
| 1 | 0 | 1 | 1 | y6 |
| 1 | 0 | 1 | 0 | x6 |
| 1 | 1 | 0 | 1 | y7 |
| 1 | 1 | 0 | 0 | x7 |
| 1 | 1 | 1 | 1 | y8 |
| 1 | 1 | 1 | 0 | x8 |

FLUID-WORKING MACHINE AND METHOD OF DETECTING A FAULT

RELATED APPLICATIONS

The present application is a National Phase of International Application Number PCT/GB2011/050359, filed Feb. 23, 2011 and claims priority from, British Application Number 1002999.9, filed Feb. 23, 2010, and British Application Number 1003005.4, filed Feb. 23, 2010.

FIELD OF THE INVENTION

The invention relates to fluid-working machines comprising a plurality of working chambers of cyclically varying volume, each said working chamber operable to displace a volume of working fluid which is selectable for each cycle of working chamber volume, and to methods of operating such fluid-working machines.

BACKGROUND TO THE INVENTION

It is known to provide fluid-working machines, such as pumps, motors and machines which operate as either a pump or a motor, which include a plurality of working chambers of cyclically varying volume, in which the flow of fluid between the working chambers and one or more manifolds is regulated by electronically controlled valves. Although the invention will be illustrated with reference to applications in which the fluid is a liquid, such as a generally incompressible hydraulic liquid, the fluid could alternatively be a gas.

For example, fluid-working machines are known which comprise a plurality of working chambers of cyclically varying volume, in which the displacement of fluid through the working chambers is regulated by electronically controllable valves, on a cycle by cycle basis and in phased relationship to cycles of working chamber volume, to determine the net throughput of fluid through the machine. For example, EP 0 361 927 disclosed the method of controlling the net throughput of fluid through a multi-chamber pump by operating and/or closing electronically controllable poppet valves, in phased relationship to cycles of working chamber volume, to regulate fluid communication between individual working chambers of the pump and a low pressure manifold. As a result, individual chambers are selectable by a controller, on a cycle by cycle basis, to either undergo an active cycle and displace a predetermined fixed volume of fluid, or to undergo an idle cycle with no net displacement of fluid, thereby enabling the net throughput of the pump to be matched dynamically to demand. EP 0 494 236 developed this principle and included electronically controllable poppet valves which regulate fluid communication between individual working chambers and a high pressure manifold, thereby facilitating the provision of a fluid-working machine which functions as a motor or which functions as either a pump or a motor in alternative operating modes. EP 1 537 333 introduced the possibility of part active cycles, allowing individual cycles of individual working chambers to displace any of a plurality of different volumes of fluid to better match demand. By an idle cycle we refer to a cycle of working chamber volume where there is substantially no net displacement of fluid. Preferably, the volume of each working chamber continues to cycle during idle cycles. By active cycle we refer to any cycle of working chamber volume other than an idle cycle, where there is a predetermined net displacement of fluid, including part active cycles (e.g. part pump or part motor cycles) where there is a net displacement of a volume of fluid which is less than the maximum volume of fluid that the working chamber is operable to displace. Idle and active cycles may be interspersed, even at constant demand.

Fluid-working machines of this type require rapidly opening and closing electronically controllable valves capable of regulating the flow of fluid into and out of a working chamber from the low pressure manifold, and in some embodiments, the high pressure manifold. The electronically controllable valves are typically actively controlled, for example, actively opened, actively closed, or actively held open or closed against a pressure differential, under the active control of the controller. Although all opening or closing of an actively controlled valve may be under the active control of a controller, it is usually preferable for at least some opening or closing of the actively controlled valves to be passive. For example, the actively controlled low pressure valve disclosed in the fluid-working machines described above may open passively when the pressure in a working chamber falls below the pressure of the low pressure manifold, but be optionally actively held open to create an idle cycle or actively closed during a motoring cycle, just before top dead centre, to build up sufficient pressure within the working chamber to enable the high pressure valve to open.

An active cycle or an idle cycle may result from the active control of the electronically controllable valves. An active cycle or an idle cycle may result from the passive control of the electronically controllable valves.

In the event that one or more working chambers of a fluid-working machine comprising a plurality of working chambers become unavailable, for example if a fault occurs in one or more working chambers or in the control of one or more working chambers, the function of the fluid-working machine is dramatically impaired.

FIG. 1 shows a graph of the fluid pressure as a function of time at an output port of a fluid-working machine comprising six working chambers, operating as a pump to pump fluid through a hydraulic motor driving a vehicle. The six working chambers are piston cylinders slidably mounted to the same eccentric crankshaft such that their phases are mutually spaced apart by 60°. The machine includes a pressure accumulator to smooth the output from the individual working chambers. The machine comprises a controller which is operable to select the valve firing sequence in order to meet the demand signal.

Between time A and time B, the fluid working machine is functioning normally and the output pressure remains approximately constant in response to a constant displacement demand signal (corresponding to a constant vehicle speed) and valves are fired according to the method outlined in EP 0 361 927. The fluid-working machine executes a pattern of working chamber activations that repeats every five revolutions. The trace of output pressure with time shows both a fast pressure oscillation due to the fluid delivery by the individual activated working chambers, and a slow oscillation due to the short term average flow delivered by the activated working chambers being at times slightly above and at times slightly below the average flow required to maintain the same vehicle speed.

At time B, one of the six working chambers was deactivated, in order to simulate a malfunction in that working chamber. Between time B and time C, in response to the same demand signal, the output pressure initially drops dramatically when the controller causes the machine to try to activate the disabled working chamber. In response, the vehicle slows down, so when the controller returns to that part of the repeating pattern that does not use the deactivated working chamber, there is an excess of flow and a pressure overshoot. The cycle repeats each time an attempt is made to activate the disabled working chamber.

Thus, known fluid-working machines, which, in the event of the unavailability of one or more working chambers, issue output signals to meet a demand signal as though all of the working chambers were available, fail to function adequately when a working chamber is unavailable.

Therefore, there remains a need for a method of operating a fluid-working machine which mitigates this problem, and a need for fluid-working machines which perform better when a working chamber, or a group of working chambers, or apparatus associated with one or more working chambers, develops a fault. Thus, the invention address the problem of identifying, confirming or diagnosing a fault in a fluid-working machine.

SUMMARY OF THE INVENTION

According to a first aspect of the present invention there is provided a method of detecting a fault in a fluid-working machine comprising a plurality of working chambers of cyclically varying volume, each said working chamber operable to displace a volume of working fluid which is selectable for each cycle of working chamber volume to carry out a working function responsive to a received demand signal, the method comprising determining whether a measured output parameter of the fluid working machine which is responsive to the displacement of working fluid by one or more of the working chambers to carry out the working function fulfils at least one acceptable function criterion, the method characterised by taking into account the previously selected net displacement of working fluid by a working chamber during a cycle of working chamber volume to carry out the working function.

By taking into account the previously selected net displacement of working fluid by a working chamber during a cycle of working chamber volume to carry out the working function, an unacceptable fault in a fluid-working machine may be detected if it causes one or more measured output parameters to respond in a way which would not be expected if the fluid working machine was functioning acceptably.

By a previously selected net displacement of working fluid we include active cycles of working chamber volume for which the decision point as to the displacement of working fluid during a cycle of working chamber volume has already occurred. The volume of the working chamber may not have completed a full cycle, or it may have completed one or more full cycles. Typically, the volume selected more than a predetermined number of cycles previously will not be taken into account. The measured output parameter is typically related to the pressure or flow rate of working fluid but may, for example, be the torque of a crankshaft, of a parameter related thereto. A plurality of output parameters may be measured and the at least one acceptable function criterion might related to the plurality of measured output parameters.

The least one acceptable function criterion may, for example, relate to the value of the measured output parameter or it may relate to another property of the measured output parameter, such as the rate of change of the measured output parameter, or fluctuations in the measured output parameter (for example, the frequency spectrum, entropy or power density of or noise within the measured output parameter).

The at least one acceptable function criterion may comprise a criterion that the value, or another property of the measured output parameter, exceeds a threshold, is below a threshold, or is within a range.

The method of detecting a fault may be part of a method of operating a fluid-working machine comprising a plurality of working chambers of cyclically varying volume, each said working chamber operable to displace a volume of working fluid which is selectable for each cycle of working chamber volume, the method comprising selecting the volume of working fluid displaced by one or more said working chambers during each cycle of working chamber volume to carry out a working function responsive to a received demand signal, characterised by selecting the volume of working fluid displaced by a working chamber during a cycle of working chamber volume taking into account the availability of other said working chambers to displace fluid to carry out the working function.

Thus, a working chamber may be treated as unavailable responsive to detection that there is a fault associated with the working chamber (or a group of working chambers, or the fluid-working machine). Thus, the method may comprise detecting a fault associated with a working chamber (or a group of working chambers, or the fluid-working machine), treating the faulty working chamber (or chambers) as unavailable and then subsequently selecting the volume of working fluid displaced by other working chambers taking into account the non-availability of the faulty working chamber.

In addition, the taking into account of the availability of other working chambers when selecting the volume of working fluid to be displaced by a working chamber enables the fluid-working machine to displace an appropriate amount of fluid to meet a working function, responsive to a received demand signal, despite changes in the availability of working chambers. The displacement of working fluid to carry out the working function can be smoother and more closely follow the displacement indicated by the demand signal than would otherwise be the case if the availability of other working chambers was not taken into account.

Preferably, the fluid-working machine comprises a controller, and in a second aspect the invention extends to a fluid-working machine comprising a controller and a plurality of working chambers of cyclically varying volume, each said working chamber operable to displace a volume of working fluid which is selectable by the controller for each cycle of working chamber volume to carry out a working function responsive to a received demand signal, characterised by a fault detection module operable to determine whether a measured output parameter of the fluid working machine which is responsive to the displacement of working fluid by one or more working chambers to carry out the working function fulfils at least one acceptable function criterion, taking into account the previously selected net displacement of working fluid by a working chamber (or more than one working chamber) during a cycle (or more than one cycle) of working chamber volume to carry out the working function.

Typically, the controller is operable to select the volume of working fluid displaced by one or more said working chambers on each cycle of working chamber volume to carry out a working function responsive to a received demand signal, the controller being operable to select the volume of working fluid displaced by a working chamber on a cycle of working chamber volume taking into account the availability of other said working chambers to displace fluid to carry out the working function.

Thus the controller may be operable to detect a fault, and thus may be operable to determine whether a working chamber has an unacceptable fault and is therefore not available.

Preferably, the fluid-working machine comprises at least one valve associated with each working chamber operable to regulate the connection of the respective working chamber to a low pressure manifold or a high pressure manifold, at least one valve associated with each working chamber being electronically controllable under the active control of the controller to select the volume of working fluid displaced during a cycle of working chamber volume.

The controller may receive the demand signal and actively control the said electronically controllable valves, in phased relationship to cycles of working chamber volume, to select the displacement of fluid by one or more of the working chambers on each cycle of working chamber volume, responsive to the received demand signal. The controller may actively control the said electronically controllable valves, in phased relationship to cycles of working chamber volume, to regulate the time-averaged displacement of the working chambers, responsive to the received demand signal.

The fluid working machine may function only as a motor, or only as a pump. Alternatively, the fluid working machine may function as either a motor or a pump in alternative operating modes.

It may be that the availability of a working chamber is determined responsive to a measurement of working chamber status, or the status of a group of working chambers or the status of the fluid-working machine. The status of each working chamber and/or the fluid-working machine may be detected continuously. The status of each working chamber and/or the fluid-working machine may be detected periodically. Working chamber status detection means (for example, one or more sensors, or a working chamber status detection module operable to receive data from one or more sensors) may be provided to measure working chamber status. The fluid-working machine may be operable to measure the status of each working chamber and to determine the availability of each working chamber responsive thereto.

Whether or not there is a fault may be determined taking into account one or more predetermined conditions. Thus, it may be that a working chamber continues to be treated as available despite detection of one of a group of types of fault which are acceptable, or acceptable for a period of time, or acceptable if they occur below a certain rate, for example, detection that a working chamber is leaking fluid slowly.

The fluid-working machine may further comprise fault detection means, operable to detect a fault in the fluid-working machine. Fault detection means may comprise working chamber status detection means. Working chamber status detection means may function as fault detection means, operable to detect a fault associated with one or more working chambers.

Working chamber status detection means, or fault detection means, may comprise one or more sensors of an output parameter of the fluid working machine, an individual working chamber, or a group of working chambers, or a working function, or the high pressure manifold, or a region of the high pressure manifold (for example a region of the high pressure manifold associated with a group of working chambers) or the low pressure manifold, or a region of the low pressure manifold (for example a region of the low pressure manifold associated with a group of working chambers). The one or more sensors may be selected from one or more of the group comprising; a pressure sensor operable to measure the pressure of working fluid received by or output by one or more working chambers, a temperature sensor, a flow sensor, an acoustic or vibration sensor operable to detect vibrations or sound made by a working chamber or component of a working chamber, a voltage or current sensor operable to measure one or more properties of the response of a valve associated with a working chamber to a control signal, a displacement or velocity sensor associated with a working function, a crankshaft speed or torque sensor. The working chamber status detection means may comprise a working chamber status detection module operable to receive data from one or more sensors. Fault detection means may comprise a fault detection module operable to receive data from one or more sensors.

By an output parameter we refer to a measurable parameter which is responsive to the previously selected net displacement of working fluid by a working chamber during a cycle of working chamber volume to carry out the working function. In some embodiments, the output parameter could be a measurable property associated with an inlet to the fluid working machine, for example the pressure in an inlet manifold might vary measurably with net displacement.

The working chamber status detection module, or the fault detection module, may be operable to detect the variability over time, or the rate of variation, of the received data. In some embodiments, the working chamber status detection module, or the fault detection module, is operable to determine whether a measured output parameter of the fluid-working machine meets at least one acceptable function criterion.

Preferably whether the measured output parameter meets the at least one acceptable function criterion is determined by taking into account the volume of working fluid previously selected to be displaced by each said working chamber to carry out the working function. For example, the at least one acceptable function criterion may depend on the volume of working fluid previously selected to be displaced by one or more working chambers during one or more cycles of working chamber volume to carry out the working function. The at least one acceptable function criterion may be selected to encompass only clearly correct function of the fluid working machine, or a part thereof, or may be selected to allow some malfunctions which are minor, or tolerable for a period of time. The machine may be operable to determine from the measured output parameter that there is an acceptable fault and to log or output the detection of an acceptable fault, for example in a working chamber, but to continue to treat the working chamber as available provided that measured output parameter continues to meet the at least one acceptable function criterion.

The controller may comprise working chamber status detection means (e.g. a working chamber status detection module) which detects the status of a working chamber by analysing a measured output parameter (or more than one measured output parameter) of the fluid-working machine which is responsive to the amount of fluid displaced by the working chamber. For example, the pressure of working fluid at an output of the fluid-working machine, or the torque exerted on a crankshaft of the fluid-working machine, may depend on the amount of fluid displaced by a working chamber for a period of time during and after the displacement of working fluid by the working chamber and so the one or more measured output parameters may comprise the pressure of working fluid, the rate of flow of working fluid, or the torque exerted on a crankshaft, or their rates of change. The controller may be operable to select the quantity of working fluid displaced by a working chamber during a cycle of working chamber volume to facilitate detection of the status of the working chamber by working chamber status detection means. For example, the working chamber may be instructed to carry out an idle cycle instead of an active cycle, or an active cycle instead of an idle cycle, and the working chamber status detection means may determine whether this affects the measured output parameter. If this does not significantly affect the measured output parameter, it implies that the working chamber is faulty.

Accordingly, in some embodiments, the controller (or the working chamber status detection means, or a working chambers status detection module, functioning as a fault detection means or a fault detection module) is operable to execute a fault confirmation procedure in response to determining that measured output parameters has not met at least one acceptable function criterion.

The fault confirmation procedure may comprise postulating that a fault has occurred in a working chamber (or, in some embodiments, postulating that a fault has occurred in each working chamber in turn, or in a group of working chambers, or postulating that a fault associated with one or more working chambers has occurred), selecting a volume of fluid to be subsequently displaced by the said working chamber which is different to the volume of fluid which would have been selected if the fault confirmation procedure had not been executed, and determining from the measured output parameter during the fault confirmation procedure whether there is a fault in the working chamber.

The method may comprise determining whether the measured output parameter (or a plurality of measured output parameters) fulfils at least one acceptable function criterion (e.g. acceptable values of the measured output parameter, or properties of the measured output parameters, such as their rate of change with time), executing the fault confirmation procedure if the at least one acceptable function criterion are not met and again determining whether the measured output parameter fulfils at least one acceptable function criterion. The method may comprise causing a working chamber, or chambers, to carry out an idle cycle instead of an active cycle, or an active cycle instead of an idle cycle, and determining if this affects whether the measured output parameters fulfil the at least one acceptable function criterion.

The fault confirmation procedure may comprise treating a working chamber, or each working chamber in turn, as unavailable.

The fault confirmation procedure may comprise postulating that a fault has occurred in, or associated with a working chamber, selecting a volume of working fluid to be displaced by the working chamber during a cycle of working chamber volume which is different to the volume which would have been selected if the fault confirmation procedure had not been executed, and measuring the response of the measured output parameter.

For example, the fault confirmation procedure may comprise causing the pattern of working chambers undergoing active cycles and idle cycles (but not the expected average output of the fluid-working machine) to be different to what it would otherwise have been.

During the fault confirmation procedure, the volume of working fluid to be displaced by one or more working chambers during a plurality of cycles of working chamber volume may be selected so that the time averaged net displacement of working fluid by one or more working chamber to meet a working function should be not be significantly different to the time averaged net displacement of working fluid by the one or more working chambers which would have occurred had the fault conformation procedure not been executed, if each of the said one or more working chambers is functioning correctly. If it transpires that the time averaged net displacement of working fluid is significantly different, this is indicative that at least one of the one or more working chambers if not functioning correctly. Typically the controller will select active and idle working chamber cycles such that the rate of change in flow or pressure is minimised. A fault in one cylinder may be detected by an increase in said rate of change of flow or pressure.

Accordingly, the invention extends to a method of confirming that a fault associated with one or more working chambers has occurred in a fluid-working machine comprising a plurality of working chambers of cyclically varying volume, each said working chamber operable to displace a volume of working fluid which is selectable by a controller for each cycle of working chamber volume, the method comprising selecting the volume of working fluid displaced by one or more said working chambers during each cycle of working chamber volume to carry out a working function responsive to a received demand signal, wherein the controller is operable to determine an expected average output of the fluid-working machine from the volume of working fluid which has been selected to be displaced, characterised by causing a change in the volume of fluid to be subsequently displaced by one or more working chambers in comparison to the volume of fluid which would have been displaced if the fault confirmation procedure had not been executed, the change not causing a change in the expected average output of the fluid-working machine, and determining the extent of any change in the measured value.

The fault confirmation procedure may comprise causing the pattern of working chambers undergoing active cycles and idle cycles (but not the expected average output of the fluid-working machine) to be changed.

Thus, the fault confirmation procedure may be implemented so as to identify a fault or faults in one or more working chambers without causing a substantial change in the output of the fluid working machine, except briefly in the event that a fault is identified. For example, the controller may detect that the fluid pressure or flow output is oscillating, in the manner shown in FIG. 1, and cause the fault confirmation procedure to be executed. Changing the volume of fluid to be displaced by one or more of the working chambers without changing the expected output of the fluid-working machine (such as by substituting one or more active cycles of a working chamber for one or more active cycles of another working chamber) enables the fluid-working machine to continue to meet a working function and respond to a demand signal whilst the fault confirmation procedure is carried out.

The fault confirmation procedure may further comprise changing the current operating conditions of the fluid-working machine, for example the crankshaft rotation speed, a high pressure manifold pressure or timing of the activation of valves with respect to crankshaft rotation and determining whether an output parameter of the fluid working machine changes as expected.

The controller (or the working chamber status detection means) may be operable to calculate an expected property (e.g. the value of, rate of change of etc.) of an output parameter of the fluid working machine, and operable to compare an expected property to the corresponding property of the measured output parameter of the fluid working machine. The method may comprise comparing an expected property to a corresponding property of the measured output parameter of the fluid working machine taking into account the volume of working fluid previously selected to be displaced by each said working chamber to carry out the working function during one or more cycles of working chamber volume.

Preferably, the controller takes into account the availability of a working chamber based upon received working chamber availability data. The working chamber availability data may be stored working chamber availability data (for example data stored on computer readable media), accessible by the controller. For example, working chamber availability data may be stored in a working chamber database. The working chamber database may, in some embodiments, additionally specify the relative phase of a plurality of working chambers of a fluid working machine.

Working chamber availability data may comprise data received from the working chamber status detection means. Working chamber availability data, which may be stored working chamber availability data, may be continuously, or periodically, amended using data received from the working chamber status detection means.

The controller may be operable to interrogate a working chamber database, and/or working chamber status detection means and thereby receive working chamber availability data.

A working chamber may be treated as unavailable when the working chamber is allocated to a working function other than the said working function or when a working chamber is not allocated to a or any working function.

Accordingly, working chamber availability data may comprise data allocating a working chamber or chambers to a working function other than the said working function, or data isolating a working chamber or chambers from a working function.

Working chamber availability data may comprise data received from user input means. For example, working chamber availability may be set by an operator during installation, assembly or maintenance of the fluid working machine.

Working chamber availability data may be updated responsive to a demand signal, which may be the demand signal or one or more further demand signals, which may in some embodiments be received from user input means.

Typically, the fluid-working machine comprises one or more ports, one or more of which are associated with the working function, and the fluid-working machine is configurable to direct working fluid along a fluid path selectable from amongst a group of different fluid paths to carry out the working function, each fluid path in the group of different fluid paths extending between one or more said ports and one or more working chambers. A working chamber may be allocated to the working function if the selected fluid path extends between the one or more ports associated with the working function and the working chamber. A working chamber may be allocated to a working function other than the said working function, or not allocated to any working function, if no selected fluid path extends between the one or more ports associated with the working function and the working chamber.

The fluid working machine may be manually configurable to select a fluid path from amongst the group of different fluid paths. Typically, the fluid working machine is operable to automatically select a fluid path from amongst the group of different fluid paths.

Typically, the fluid-working machine is selectively configurable to direct working fluid along two or more (typically non-intersecting) fluid paths selectable from amongst the said group of different fluid paths to concurrently carry out two or more different working functions using different working chambers (for example, different groups of one or more working chambers). Each working function may be associated with a different one or more of the said ports. The fluid-working machine may be operable to automatically select two or more fluid paths from amongst the group of different fluid paths.

The fluid-working machine may comprise one or more flow regulation valves associated with the group of different fluid paths which are selectively controllable to select a fluid path (or a plurality of fluid paths concurrently). The fluid-working machine typically comprises one or more conduits, which may be a network of conduits, the conduits comprising a portion or all of one or more or all of the fluid paths. Typically some or all of the one or more flow regulation valves are positioned in a conduit.

Preferably, at least one, and typically a plurality, of the said fluid paths are fluid paths in which fluid is directed in parallel through a plurality of working chambers to carry out the working function.

Accordingly, the method may comprise configuring the fluid-working machine by selecting a fluid path from amongst a group of different fluid paths, each fluid path in the group of different fluid paths extending between one or more said ports and one or more working chambers. The fluid path may be selected in order to direct working fluid to carry out the working function, or more than one working function. In some embodiments, the method comprises selecting a plurality of fluid paths to carry out a plurality of working functions.

Either or both sources and loads may be connected to the one or more ports associated with a working function. A working function may comprise pumping fluid to a load or receiving fluid from a source. A working function may comprise one or more of: driving or being driven by an hydraulic ram, motor or pump; pumping fluid to a hydraulic transmission; receiving fluid from a hydraulic transmission; receiving fluid to drive an electrical generator; pumping fluid to activate a brake mechanism; and receiving fluid from a brake mechanism to enable regenerative braking.

A working chamber may be treated as available to displace fluid to carry out the working function if the fluid-working machine is configured to direct fluid through the working chamber to carry out the working function. A working chamber may be treated as unavailable to displace fluid to carry out the working function if the fluid-working machine is not configured to direct fluid through the working chamber to carry out the working function.

In some embodiments, the amount of fluid displaced by one or more first said working chambers during an individual cycle of working chamber volume is greater than would be the case if a second said working chamber was available to carry out the working function.

Preferably, each working chamber is operable on each cycle of working chamber volume to carry out an active cycle in which the chamber makes a net displacement of working fluid or an idle cycle in which the chamber makes substantially no net displacement of working fluid. It may be that each working chamber is operable to displace one of a plurality of volumes of working fluid (for example, a range of volumes of working fluid) during an active cycle. The said range of volumes may be discontinuous, for example, the range of volumes of working fluid may comprise a range extending from a first minimum of substantially no net fluid displacement, to a first maximum of at most 25% or 40% of the maximum net fluid displacement of a working chamber, and then from a second minimum of at least 60% or 75% of the maximum net fluid displacement of a working chamber, to a second maximum in the region of 100% of the maximum net fluid displacement of a working chamber. This may occur where, for example, the operating working fluid pressure is sufficiently high that it is not possible to open or close valves in the middle of expansion or contraction strokes of working chamber volume, or the fluid flow is sufficiently high that operating with a continuous range of volumes would be damaging to the working chamber, the valves of the working chamber, or other parts of the fluid working machine.

Thus, the fluid-working machine may be operable such that, on at least some occasions, a first working chamber carries out an active cycle instead of an idle cycle as a result of the non-availability of a second working chamber. Thus, the method may comprise determining that the second working chamber is unavailable and responsively causing the first working chamber to execute an active cycle instead of an idle cycle.

The controller may comprise a phase input for receiving a phase signal indicative of the phase of volume cycles of working chambers of a fluid working machine. The phase signal may be received from a phase sensor, for example an optical, magnetic or inductive phase sensor. The phase sensor may sense the phase of a crankshaft (which may be an eccentric crankshaft) and the controller may infer the working chamber phase from the sensed crankshaft phase.

The controller selects the volume to be displaced by (usually individual) working chambers on each successive cycle of working chamber volume. The controller may comprise working chamber volume selection means (such as a working chamber selection module) operable to select the volume to be displaced by working chambers on each successive cycle of working chamber volume. The working chamber volume selection means typically comprise a processor and a computer readable carrier (such as RAM, EPROM or EEPROM memory) storing program code comprising a working chamber volume selection module (which may in turn be comprised of a plurality of software modules). Typically, the controller comprises a said processor which controls a one or more other functions of the fluid working machine as well as selecting the volume displaced by working chambers on each successive cycle of working chamber volume.

The controller (typically the working chamber volume selection means) typically takes into account a plurality of input data including working chamber availability data when selecting the volume to be displaced by a working chamber during a cycle of working chamber volume. Typically, for at least some input data including working chamber availability data indicative that the second working chamber is available to carry out the working function, the controller (typically the working chamber volume selection means) is operable to determine that the first working chamber should carry out an idle cycle, and for the same input data except that the working chamber availability data is indicative that the second working chamber is not available to carry out the working function, the controller (typically the working chamber volume selection means) is operable to determine that the first working chamber should carry out an active cycle.

It may be that, in at least some circumstances, the volume cycles of the first said working chamber are phased earlier than volume cycles of the second said working chamber. It may be that, in at least some circumstances, the volume cycles of the first said working chamber are phased later than volume cycles of the second said working chamber. It may be that, in at least some circumstances, the volume cycles of the first said working chamber are in synchrony with volume cycles of the second said working chamber.

Preferably, when the demand indicated by the received demand signal is sufficiently low, one or more working chambers operable to displace fluid to carry out the working function is redundant during one or more cycles of working chamber volume, that is to say, if the working chamber was not present or was not operating, the fluid-working machine could anyway displace sufficient fluid to meet the demand without changing the overall frequency of active cycles of working chamber volume.

Preferably, when the demand indicated by the received demand signal is sufficiently low, the selected volume of fluid displaced by at least one of the working chambers which are available to carry out the working function is substantially zero for at least some cycles of working chamber volume. In some embodiments, when the demand indicated by the received demand signal is sufficiently low, at least one of the working chambers which are available to carry out the working function carries out an idle cycle for at least some cycles of working chamber volume. Idle cycles and active cycles may be interspersed, even where the received demand signal is constant. In some embodiments, wherein the working chambers are operable to displace one of a plurality of volumes of working fluid, when the demand indicated by the received demand signal is sufficiently low, the selected volume of fluid displaced by at least one of the working chambers which are available to carry out the working function is less than the maximum volume of working fluid which the said at least one of the working chambers is operable to displace. In some embodiments, when the demand indicated by the received demand signal is sufficiently low, at least one of the working chambers which are available to carry out the working function carries out a part active cycle for at least some cycles of working chamber volume.

The received demand signal may indicate a desired volume of working fluid to be displaced (e.g. received or output) to fulfil a working function. The received demand signal may indicate a desired output or input pressure. The received demand signal may indicate a desired rate to displace fluid to fulfil a working function. A fluid response sensor may be provided to monitor a property of received or output fluid, for example, the pressure of received or output fluid, or the rate of displacement of received or output fluid, and to provide a fluid response signal. The controller may compare the fluid response signal and the received demand signal to select the volume of working fluid displaced by one or more said working chambers on each cycle of working chamber volume, for example to perform closed loop control. The fluid response signal may also function as the measured operating parameter.

According to a third aspect of the present invention, there is provided a fluid working machine controller comprising a working chamber database specifying the relative phase of a plurality of working chambers of a fluid working machine, a demand input for receiving a demand signal, a phase input for receiving a phase signal indicative of the phase of volume cycles of working chambers of a fluid working machine, working chamber availability data specifying which of the plurality of working chambers are available, and a displacement control module operable to select the volume of working fluid to be displaced by each of a plurality of working chambers specified by the working chamber database on each cycle of working chamber volume taking into account the received phase signal, the received demand signal and the working chamber availability data.

The working chamber availability data may be stored working chamber availability data (for example data stored on computer readable media), accessible by the controller.

The working chamber availability data may be stored in the working chamber database. The working chamber database (and the working chamber availability data) is typically stored in or on a computer readable carrier, such as a RAM memory.

Working chamber availability data may comprise data received from working chamber status detection means of a fluid-working machine. Working chamber availability data, which may be stored working chamber availability data, may be continuously, or periodically, updated using data received from working chamber status detection means.

The controller may be operable to interrogate the working chamber database, and/or working chamber status detection means and thereby receive working chamber availability data.

A working chamber may be treated as unavailable when the working chamber is allocated to a working function other than the said working function or when a working chamber is not allocated to a or any working function.

Accordingly, working chamber availability data may comprise data allocating a working chamber or chambers to a working function other than the said working function, or data isolating a working chamber or chambers from a working function.

Working chamber availability data may comprise data received from user input means. For example, working chamber availability may be set by an operator during installation, assembly or maintenance of a fluid working machine.

Preferably, the fluid working machine controller is operable (for example by interrogating a working chamber availability database, and/or working chamber status detection means) to periodically determine the status of each working chamber and to treat a working chamber as unavailable if the working chamber is determined to be functioning incorrectly. The fluid working controller may execute a software module functioning as working chamber status detection means.

Preferably, the fluid working machine controller is operable to amend the working chamber availability data concerning a working chamber responsive to a change in the working function allocated to the working chamber. Working chamber availability data may be amended responsive to a demand signal, which may be the demand signal or one or more further demand signals, which may in some embodiments be received from user input means.

Preferably, the displacement control module is operable to select the volume of working fluid to be displaced by each of the plurality of working chambers by determining the timing of valve control signals.

The step of the method of detecting a fault in a fluid-working machine, of determining whether the measured output parameter fulfils at least one acceptable function criterion may be carried out a period of time after a selection of a net displacement of working fluid by a working chamber during a specific cycle of working chamber volume. It may not be necessary to consider whether the measured output parameter fulfils at least one acceptable function criterion following the selection of an idle cycle in which there is no net fluid displacement. Thus, the method may comprise interspersing idle cycles in which no net displacement of working fluid by a working chamber is selected and active cycles in which a net displacement of working fluid by the same working chamber is selected (that is to say, selection of an active cycle), wherein the step of determining whether the measured output parameter fulfils at least one acceptable function criterion is not carried out responsive to selection of no net displacement of working fluid by a working chamber (that is to say, selection of an idle cycle).

It may be that the measurement of the measured output parameter of the fluid working machine (or the determination whether the measured output parameter fulfils at least one acceptable function criterion if the output parameter is measured continuously) is responsive to the previously selected net displacement of working fluid by a working chamber during a cycle of working chamber volume to carry out the working function.

In some embodiments, the method may comprise determining the current operating conditions of the fluid working machine, determining whether the current operating conditions are suitable for carrying out the method of fault detection (for example, by comparing the current operating conditions against stored data comprising operating conditions which are suitable for executing the method of fault detection—i.e. those operating conditions in which, when the fault detection method is executed, there is no risk, or an acceptably low risk, of producing false positives or negatives), and carrying out the method of fault detection method if the current operating conditions are suitable.

The fluid-working machine may comprise a controller, operable to determine whether the current operating conditions are suitable to carry out the method of fault detection (and typically also operable to carry out the method of fault detection, and/or to select the volume of working fluid displaced by one or more said working chambers on each cycle of working chamber volume, to carry out a working function responsive to a received demand signal).

It may be that the operating conditions are suitable if the received demand signal is below a fault detection threshold, or above a fault detection threshold. Parameters relevant to the suitability of the operating conditions may include operating conditions of the working function, e.g. the configuration of loads, conduits or compliant circuits (e.g. a fluid accumulator or other hydraulic energy storage device) fluidically connected to the working function. Parameters relevant to the suitability of the operating conditions may include operating pressure, shaft speed and fluid temperature in the fluid-working machine. Parameters relevant to the suitability of the operating conditions may include that a controller has a sufficient resources, for example processor execution time, to operate the fault detection method while fulfilling other tasks. Parameters relevant to the suitability of the operating conditions may include the pattern or sequence of previously selected net displacements of working fluid by one or more working chambers during their respective cycles of working chamber volume to carry out the working function. Thus, the pattern or sequence of activation and deactivation of other working chambers may activate or inhibit the fault detection method. Parameters relevant to the suitability of the operating conditions may include any of the above factors in combination, either to activate or inhibit the fault detection method.

Preferably the method of fault detection comprises taking into account the previously selected net displacement of working fluid by more than one working chamber, when determining whether a measured output parameter of the fluid working machine fulfils an acceptable function criterion. Typically, the value of the measured output parameter at a given time depends on the previously selected displacement of fluid by more than one working chamber. The acceptable function criterion may depend on the selected displacement of working chambers in addition to the working chamber being assessed for a fault. The method of fault detection may comprise taking into account the previously selected net displacement of working fluid by more than one working chamber, including at least one working chamber other than the working chamber being assessed for a fault.

Where the measured output parameter is, for example, the pressure or rate of flow of working fluid, the instantaneous value of the measured output parameter can be sensitive to the amount of working fluid displaced by more than one working chamber (typically, each working chamber which is operable to displace fluid to carry out the working function) over one or more cycles of working chamber volume. Thus, the at least one acceptable function criterion may depend on the volume of working fluid previously selected to be displaced by one or more said working chambers to carry out the working function over one or more than one cycle of working chamber volume.

For example, the method may comprise comparing an output parameter following a given sequence of active (and/or part active) and idle cycles of working chamber volume, executed by a group, or a subset of a group, of working chambers (e.g. some or all of the working chambers allocated to a working function) including an active cycle of a working chamber (or chambers) being assessed for a fault, with the output parameter following the said sequence including an idle cycle of the working chamber (or chambers) being assessed for a fault, or following the said sequence not including the said working chamber or chambers. The respective sequences comprising an active cycle and an idle cycle, respectively, of the working chamber being assessed for a fault, may arise as a consequence of meeting a said demand signal, or may arise by the execution of a fault detection procedure.

In some embodiments, the method comprises taking into account one or more prior operating conditions (such as crankshaft speed or fluid pressure). In some embodiments, one or more additional prior operating conditions are taken into account in addition to taking into account the previously selected net displacement of working fluid by more than one working chamber.

The method may comprise the step of comparing a property of the measured output parameter with an expected property of the measured output parameter which is determined taking into account the volume of working fluid previously selected to be displaced by one or more said working chambers (during one or more cycles of working chamber volume) to carry out the working function. The expected property of the measured output parameter may be determined taking into account the volume of working fluid previously selected to be displaced by a working chamber to carry out the working function during each of two (or more) consecutive cycles of working chamber volume. The expected property may be calculated or may be based on historical data (e.g. data stored on a controller).

The expected property of the measured output parameter may, for example, relate to the value of the measured output parameter or it may relate to another property of the measured output parameter, such as the rate of change of the measured output parameter, or fluctuations in the measured output parameter (for example, the frequency spectrum, entropy, or power density of, or noise within the measured output parameter). The comparison between the property of the measured output parameter and the expected value of the property of the measured output parameter may, for example, be a determination whether the property and the expected valve of the property are within a defined amount, or proportion of each other, or whether one is greater or lesser than the other.

The fault detection module typically comprises or consists of a software module executed by a processor which is, or is part of, the controller.

The fault detection module may determine whether the measured output parameter fulfils at least one acceptable function criterion a period of time after a selection of a net displacement of working fluid by a working chamber during a specific cycle of working chamber volume. It may not be necessary to consider whether the measured output parameter fulfils at least one acceptable function criterion following the selection of an idle cycle in which there is no net fluid displacement. Thus, the controller may be operable to intersperse idle cycles in which no net displacement of working fluid by a working chamber is selected and active cycles in which a net displacement of working fluid by the same working chamber is selected (that is to say, selection of an active cycle), and inhibit or prevent the fault detection module determining whether the measured output parameter fulfils the at least one acceptable function criterion responsive to selection of no net displacement of working fluid by a working chamber (that is to say, selection of an idle cycle).

The method may comprise the step of comparing a property (e.g. the value of, rate of change of etc.) of the measured output parameter with an expected property of the measured output parameter which is determined taking into account the volume of working fluid previously selected to be displaced by one or more said working chambers (during one or more cycles of working chamber volume) to carry out the working function. The expected property of the measured output parameter may be determined taking into account the volume of working fluid previously selected to be displaced by a working chamber to carry out the working function during each of two consecutive cycles of working chamber volume.

The expected property of the measured output parameter may, for example, relate to the value of the measured output parameter or it may relate to another property of the measured output parameter, such as the rate of change of the measured output parameter, or fluctuations in the measured output parameter (for example, the frequency spectrum, variance, or power density of the measured output parameter). The comparison between the property of the measured output parameter and the expected value of the property of the measured output parameter may, for example, be a determination whether the measured property and the expected property are within a defined amount, or proportion of each other, or whether one is greater or lesser than the other.

Preferably, the controller is operable to receive the measured output parameter, for example from one or more sensors associated with an output of the fluid working machine. In some embodiments, the controller is operable to receive one or more further measurements of output parameters, from one or more sensors associated with an output of the fluid working machine. In some embodiments, the controller is operable to receive further measured output parameters from sensors associated with further outputs of the fluid working machine.

Typically, the expected property is determined taking into account that substantially no working fluid previously was selected to be displaced by one or more working chambers during one or more previous cycles of working chamber volume and/or that fluid was selected to be displaced by one more working chambers during one or more previous cycles of working chamber volume. One or more working chambers may have been previously selected to carry out one or more idle cycles. One or more working chambers may have been previously selected to carry out one or more part-active cycles, or active cycles.

In some embodiments, the volume of fluid selected to be displaced by each said working chamber to carry out the working function during a cycle of working chamber volume, or during one or more cycles of working chamber volume, is taken into account. In some embodiments, the volume of fluid selected to be displaced by each said working chamber during a plurality of cycles of working chamber volume is taken into account (typically between two and five cycles of working chamber volume and in some embodiments more than five cycles of working chamber volume). The volume of fluid previously selected to be displaced by each said working chamber during a predetermined period of time may be taken into account when determining the expected property.

Thus, by taking into account the volumes of working fluid selected for displacement by more than one working chamber and/or over more than one cycle of working chamber volume, when determining the expected property, a fault may be more readily detected. The expected property may be calculated taking into account the volume of fluid previously selected to be displaced over a predetermined period of time or number of cycles of working chamber volume.

The method may comprise detecting a fault associated with a working chamber by determining an expected property of a measured output parameter taking into account the volume of working fluid selected to be displaced by the respective working chamber to carry out the working function during at least one preceding cycle of volume of the respective working chamber.

In embodiment of the fluid-working machine comprising one or more ports, one or more of which are associated with the working function, and wherein the fluid-working machine is configurable to direct working fluid along a fluid path selectable from amongst a group of different fluid paths to carry out the working function, each fluid path in the group of different fluid paths extending between one or more said ports and one or more working chambers, the method may comprise detecting a fault in a fluid path, comprising determining whether a measured output parameter of the fluid working machine which is responsive to the displacement of working fluid along the respected fluid path fulfils at least one acceptable function criterion taking into account the volume of working fluid previously selected to be displaced by the one or more working chambers to which the fluid path extends.

The fluid-working machine may comprise one or more sensors located between each said port and one or more of the working chambers, operable to measure an output parameter of the fluid-working machine associated with one or more working chambers, for example the working chambers associated with a fluid path.

The method may comprise determining whether one or more output parameters meet at least one acceptable function criterion to determine whether there is or may be a fault in respect of one or more of the or each said working chamber.

The step of determining whether the output parameter fulfils at least one acceptable function criterion may be determined by taking into account the volume of fluid previously displaced by the fluid-working machine and/or the or each working chamber, as the case may be. In some embodiments, the flow rate, or pressure, or variations in the flow rate, pressure, or rate of change of the volume of the fluid previously displaced by the fluid-working machine and/or the or each working chamber, as the case may be, may be taken into account.

The output parameter may be responsive to the working function.

The method may comprise executing a fault confirmation procedure in response to a measured value related to an output of the fluid-working machine, wherein the fault confirmation procedure comprises postulating that a fault has occurred in a working chamber, causing a change to the volume of fluid to be subsequently displaced by the said working chamber in comparison to the volume of fluid which would have been displaced if the fault confirmation procedure had not been executed, and determining the extent of any change in the measured value.

The fault confirmation procedure may comprise postulating that a fault has occurred in each working chamber in turn.

The fault confirmation procedure may comprise postulating that a fault has occurred in one or more working chambers, causing a change in the volume of fluid to be subsequently displaced by one or more working chambers in comparison to the volume of fluid which would have been displaced if the fault confirmation procedure had not been executed, the change not causing a change in the volume of fluid selected to be displaced by the fluid-working machine to carry out the working function, and determining the extent of any change in the measured value. For example, the fault confirmation procedure may comprise causing the pattern of working chambers undergoing active cycles and idle cycles (but not the expected average output of the fluid-working machine) to be changed.

A working chamber may be treated as unavailable responsive to detection that there is a fault associated with the working chamber. The fault confirmation procedure may comprise treating a working chamber, or a group of working chambers, or each working chamber in turn, as unavailable.

The method may comprise comparing an expected value to the measured value related to an output parameter of the fluid working machine, executing the fault confirmation procedure, and again comparing the expected value to a measured value related to an output parameter of the fluid working machine.

The method may comprise causing a working chamber, or chambers, to carry out an idle cycle instead of an active cycle, or an active cycle instead of an idle cycle, and determining if this affects the measured value (or the difference between the expected and measured values).

The method may comprise selecting the volume of working fluid displaced by one or more said working chambers during each cycle of working chamber volume to carry out a working function responsive to the received demand signal, characterised by selecting the volume of working fluid displaced by a working chamber during a cycle of working chamber volume taking into account the availability of other said working chambers to displace fluid to carry out the working function.

Further preferred and optional features of the method of each of the first through third aspects of the invention correspond to preferred and optional features set out above in relation to any of the first through third aspects.

Although the embodiments of the invention described with reference to the drawings comprise fluid-working machines and methods carried out by fluid-working machines, the invention also extends to computer program code, particularly computer program code on or in a carrier, adapted for carrying out the processes of the invention or for causing a computer to perform as the controller of a fluid-working machine according to the invention.

Thus, the invention extends in a sixth aspect to computer program code which, when executed on a fluid working machine controller, causes the fluid working machine to function as a fluid working machine according to the second or fifth aspects of the invention (or both), or to carry out the method of the first or fourth aspects of the invention (or both).

Furthermore, the invention extends in an seventh aspect to computer program code which, when executed on a fluid working machine controller, functions as the displacement control module of the fluid working machine controller of the third aspect, and the invention extends in a eighth aspect to a carrier having computer program code according to the sixth or seventh aspect (or both) thereon or therein.

Computer program code may be in the form of source code, object code, a code intermediate source, such as in partially compiled form, or any other form suitable for use in the implementation of the processes according to the invention. The carrier may be any entity or device capable of carrying the program instructions.

For example, the carrier may comprise a storage medium, such as a ROM, for example a CD ROM or a semiconductor ROM, or a magnetic recording medium, for example a floppy disc or hard disc. Further, the carrier may be a transmissible carrier such as an electrical or optical signal which may be conveyed via electrical or optical cable or by radio or other means. When a program is embodied in a signal which may be conveyed directly by cable, the carrier may be constituted by such cable or other device or means.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 2:
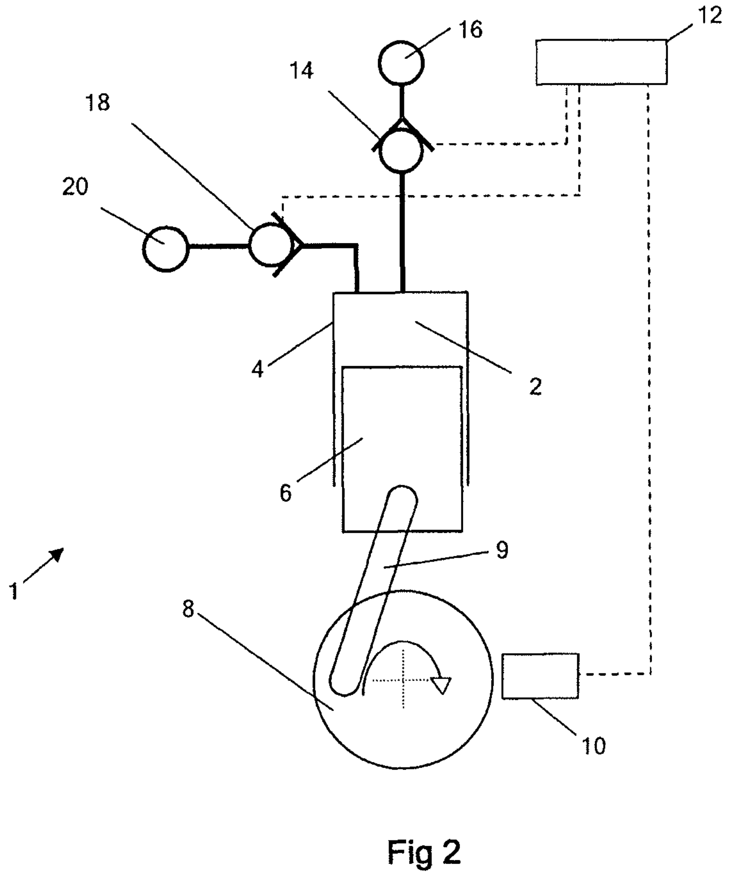
Fig 2 PRIOR ART
FIG. 2 is a schematic diagram of a known fluid-working machine.

FIG. 2 is a schematic diagram of a known fluid-working machine 1. The net throughput of fluid is determined by the active control of electronically controllable valves, in phased relationship to cycles of working chamber volume, to regulate fluid communication between individual working chambers of the machine and fluid manifolds. Individual chambers are selectable by a controller, on a cycle by cycle basis, to either displace a predetermined fixed volume of fluid or to undergo an idle cycle with no net displacement of fluid, thereby enabling the net throughput of the pump to be matched dynamically to demand.

With reference to FIG. 2, an individual working chamber 2 has a volume defined by the interior surface of a cylinder 4 and a piston 6, which is driven from a crankshaft 8 by a crank mechanism 9 and which reciprocates within the cylinder to cyclically vary the volume of the working chamber. A shaft position and speed sensor 10 determines the instantaneous angular position and speed of rotation of the shaft, and transmits shaft position and speed signals to a controller 12, which enables the controller to determine the instantaneous phase of the cycles of each individual working chamber. The controller typically comprises a microprocessor or microcontroller which executes a stored program in use.

The working chamber comprises an actively controlled low pressure valve in the form of an electronically controllable face-sealing poppet valve 14, which faces inwards toward the working chamber and is operable to selectively seal off a channel extending from the working chamber to a low pressure manifold 16. The working chamber further comprises a high pressure valve 18. The high pressure valve faces outwards from the working chamber and is operable to seal off a channel extending from the working chamber to a high pressure manifold 20.

At least the low pressure valve is actively controlled so that the controller can select whether the low pressure valve is actively closed, or in some embodiments, actively held open, during each cycle of working chamber volume. In some embodiments, the high pressure valve is actively controlled and in some embodiments, the high pressure valve is a passively controlled valve, for example, a pressure delivery check valve.

The fluid-working machine may be a pump, which carries out pumping cycles, or a motor which carries out motoring cycles, or a pump-motor which can operate as a pump or a motor in alternative operating modes and can thereby carry out pumping or motoring cycles.

A full stroke pumping cycle is described in EP 0 361 927. During an expansion stoke of a working chamber, the low pressure valve is open and hydraulic fluid is received from the low pressure manifold. At or around bottom dead centre, the controller determines whether or not the low pressure valve should be closed. If the low pressure valve is closed, fluid within the working chamber is pressurized and vented to the high pressure valve during the subsequent contraction phase of working chamber volume, so that a pumping cycle occurs and a volume of fluid is displaced to the high pressure manifold. The low pressure valve then opens again at or shortly after top dead centre. If the low pressure valve remains open, fluid within the working chamber is vented back to the low pressure manifold and an idle cycle occurs, in which there is no net displacement of fluid to the high pressure manifold.

In some embodiments, the low pressure valve will be biased open and will need to be actively closed by the controller if a pumping cycle is selected. In other embodiments, the low pressure valve will be biased closed and will need to be actively held open by the controller if an idle cycle is selected. The high pressure valve may be actively controlled, or may be a passively opening check valve.

A full stroke motoring cycle is described in EP 0 494 236. During a contraction stroke, fluid is vented to the low pressure manifold through the low pressure valve. An idle cycle can be selected by the controller in which case the low pressure valve remains open. However, if a full stroke motoring cycle is selected, the low pressure valve is closed before top dead centre, causing pressure to build up within the working chamber as it continues to reduce in volume. Once sufficient pressure has been built up, the high pressure valve can be opened, typically just after top dead centre, and fluid flows into the working chamber from the high pressure manifold. Shortly before bottom dead centre, the high pressure valve is actively closed, whereupon pressure within the working chamber falls, enabling the low pressure valve to open around or shortly after bottom dead centre.

In some embodiments, the low pressure valve will be biased open and will need to be actively closed by the controller if a motoring cycle is selected. In other embodiments, the low pressure valve will be biased closed and will need to be actively held open by the controller if an idle cycle is selected. The low pressure valve typically opens passively, but it may open under active control to enable the timing of opening to be carefully controlled. Thus, the low pressure valve may be actively opened, or, if it has been actively held open this active holding open may be stopped. The high pressure valve may be actively or passively opened. Typically, the high pressure valve will be actively opened.

In some embodiments, instead of selecting only between idle cycles and full stroke pumping and/or motoring cycles, the fluid-working controller is also operable to vary the precise phasing of valve timings to create partial stroke pumping and/or partial stroke motoring cycles.

In a partial stroke pumping cycle, the low pressure valve is closed later in the exhaust stroke so that only a part of the maximum stroke volume of the working chamber is displaced into the high pressure manifold. Typically, closure of the low pressure valve is delayed until just before top dead centre.

In a partial stroke motoring cycle, the high pressure valve is closed and the low pressure valve opened part way through the expansion stroke so that the volume of fluid received from the high pressure manifold and thus the net displacement of fluid is less than would otherwise be possible.

Fluid discharged from the fluid-working machine is typically delivered to a compliant circuit (for example a fluid accumulator) to smooth the output pressure and the time averaged throughput is varied by the controller on the basis of a demand signal received by the controller in the manner of the prior art.

Figure 3:
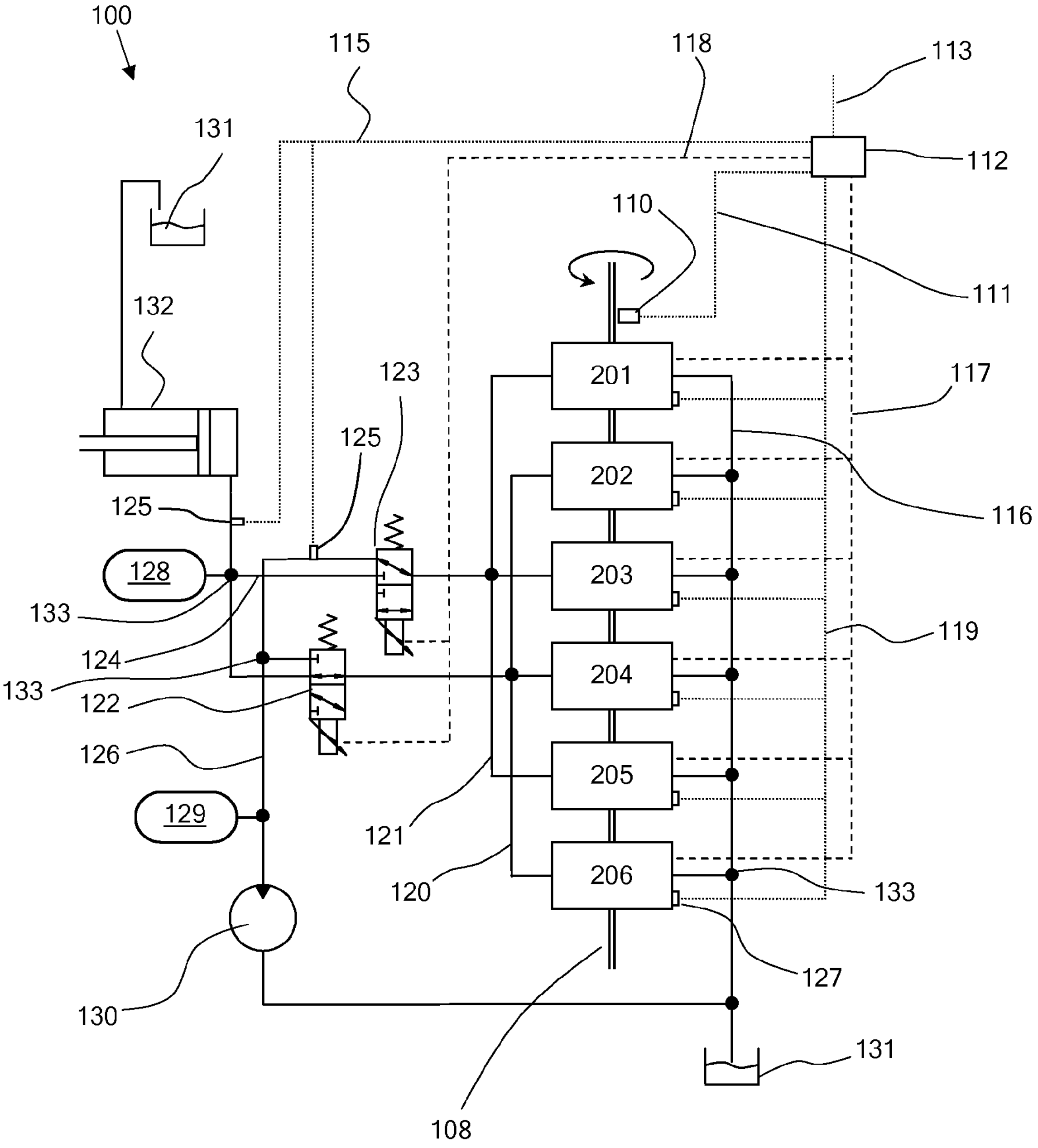
FIG. 3 is a schematic diagram of a fluid-working machine comprising six working chambers.

FIG. 3 shows a fluid working machine 100, comprising six working chambers 201, 202, 203, 204, 205 and 206 driven by an eccentric crankshaft 108. The fluid-working machine 100 includes one or more ports 133, one or more of which are associated with the working function, and the fluid-working machine 100 is configurable to direct working fluid along a fluid path selectable from amongst a group of different fluid paths to carry out the working function, each fluid path in the group of different fluid paths extending between one or more ports 133 and one or more working chambers. Each of the working chambers comprises a cylinder, a piston slidably mounted on a crankshaft eccentric, and valves between each cylinder and the low pressure manifold 116 and the two high pressure manifolds 120,121. Each of the working chambers undergoes a complete cycle of working chamber volume during a 360° rotation of the crankshaft. Adjacent working chambers are 60° out of phase, such that each reaches a given point in a cycle of working chamber volume in numerical order (201,202,203,204,205,206). The high pressure manifolds are each associated with half of the working chambers. Controller 112 receives crankshaft speed and position data 111 from speed and position sensor 110, and one or more demand signals 113 to issue command signals 117 to the valves within the working chambers. Each of the working chambers of the fluid working machine functions as described in relation to FIG. 2, above.

The routing of fluid from the fluid-working machine to the loads 130 (in this example a hydraulic motor) and 132 (a hydraulic ram) may be controlled by electronically controllable changeover valves 122 and 123 associated with high pressure manifolds 120,121 respectively. The changeover valves may be operated so as to route fluid between the associated high pressure manifold and one or other of the fluid lines 124,126. The controller receives one or more fluid pressure measurements (functioning as both the fluid response signal or signals and the measured output parameters or parameters) 115 from pressure transducers 125 positioned at fluid lines 124 and 126. Accumulators 128,129 are positioned in fluid lines 124 and 126, and function to moderate fluid pressure fluctuations.

The fluid-working machine 100 is operable as a pump, to pump fluid to fluid lines 124 and/or 126, or as a motor, to receive fluid from fluid lines 124 and/or 126. The low pressure manifold draws fluid from, or returns fluid to, reservoir 131, as appropriate.

For example, in the quiescent configuration as shown in FIG. 3, the changeover valve 122 for the high pressure manifold 120 and associated with working chambers 202, 204 and 206, routes fluid to or from hydraulic ram 132, while changeover valve 123 for the high pressure manifold 121 and associated with working chambers 201, 203 and 206, routes fluid to or from hydraulic motor 130. Activation of only changeover valve 122 routes fluid from both high pressure manifolds 120,121 to or from hydraulic motor 130; activation of only changeover valve 123 routes fluid from both high pressure manifolds 120,121 to or from hydraulic ram 132.

Thus the fluid-working machine is operable to route the fluid such that some or all of the working chambers pump fluid to either or both of the loads, or some or all of the working chambers function as motors receiving fluid from one or both of the loads. One or more working chambers may function as motors while one or more working chambers function as pumps.

When fluid is routed to more than one of the loads, the controller receives more than one demand signal 113 and more than one fluid pressure signal 115, and issues command signals 117 according to the method of the present invention, as discussed below. Accordingly, the fluid-working machine can displace fluid to meet more than one working function at the same time, receiving a different demand signal in relation to each working function.

Figure 4:
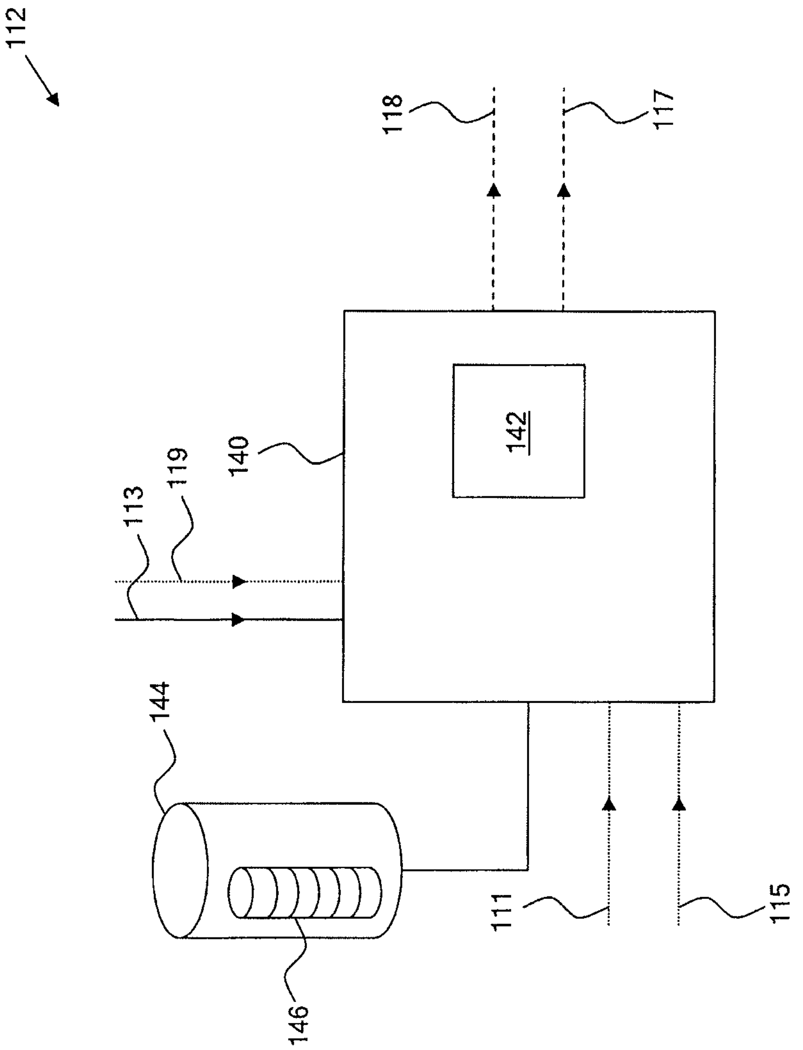
FIG. 4 shows a schematic diagram of a controller for the fluid working machine of FIG. 3.

FIG. 4 shows a schematic diagram of a controller 112 for the fluid-working machine of FIG. 3. The controller comprises a control unit 140 having a processor 142. The control unit communicates with a database 144, in which is stored working chamber data 146 relating to each of the working chambers (201,202,203,204,205,206) and comprising the relative phase of the respective working chambers and working chamber availability data. The controller (at the control unit) receives a crankshaft position signal 111 from sensor 110, a fluid pressure signal or signals 115, and a demand signal or signals 113, which are typically defined by the operator of the fluid working machine.

The control unit also receives working chamber status data 119 (which in the example of the invention shown in FIG. 3 comprises acoustic data) from acoustic sensors 127 positioned at each of the working chambers. The control unit is operable to receive, and the processor operable to distinguish, acoustic data characteristic of an active cycle of a working chamber (which may be a pumping cycle or a motoring cycle) from acoustic data characteristic of an idle cycle, or acoustic data characteristic of one or more failure modes of a working chamber (such as a working chamber responding to either an active or an idle cycle command signal, wherein valves to the high and/or low pressure manifolds fail to fully open or close).

The processor is typically a microprocessor or microcontroller which executes a stored program, in use. The stored program may encode a decision making algorithm and execution of the stored program causes the decision making algorithm to be executed periodically. The processor and stored program together form working chamber volume selection means, which select the volume of working fluid to be displaced by one (or a group) of working chambers on each cycle of working chamber volume. Thus, the controller selects the volume to be displaced by (usually individual) working chambers on each successive cycle of working chamber volume. The controller may comprise working chamber volume selection means (such as a working chamber selection module) operable to select the volume to be displaced by working chambers on each successive cycle of working chamber volume. The working chamber volume selection means typically comprise a processor and a computer readable carrier (such as RAM (Random Access Memory), EPROM (Erasable Programmable Read-Only Memory) or EEPROM (Electronically Erasable Programmable Read-Only Memory) memory) storing program code comprising a working chamber volume selection module (which may in turn be comprised of a plurality of software modules). Typically, the controller comprises a said processor which controls a one or more other functions of the fluid working machine as well as selecting the volume displaced by working chambers on each successive cycle of working chamber volume.

Typically, there will be a decision point each time one or more chambers reach a predetermined phase, whereupon the processor determines whether to select an idle cycle for the respective cycle of working chamber volume, or an active cycle, thereby selecting the net volume of working fluid to be displaced by that working chamber during the subsequent volume cycle of that working chamber.

The processor receives as inputs working chamber data from the database, working chamber status data, the crankshaft speed and position data, the fluid pressure signal or signals and the demand signal or signals.

The control unit (at the processor, in the example shown) is operable to generate command signals 117 to effect the selected net displacement of working fluid. The command signals typically comprise a sequence of commands (which may be in the form of voltage pulses) issued to the electronically controllable valves of each of the cylinders. The processor is also operable to generate routing signals 118 to the changeover valves (issued by the control unit) in order to define fluid paths along which fluid is conducted between one or more loads and one or more working chambers.

In use of the fluid-working machine (to meet a single work function in response to a single demand signal), the control unit of the controller receives the inputs mentioned above, including the demand signal (which can be a demand signal received from an operator of the fluid working machine received via user-input means (not shown) or a measured demand signal received from a sensor associated with the load (not shown)) indicative of a required fluid displacement, flow, torque or pressure as well as working chamber data from the database. At each decision point, the processor selects the net displacement of working fluid by one or more working chambers during the following cycle of working chamber volume. Typically a decision point occurs each time one or more working chambers reach a predetermined phase. The determined net displacement may be zero in which case the processor selects an idle cycle. Otherwise the processor selects an active cycle, which may be a full cycle in which the maximum stroke volume of the cylinder is displaced, or a partial cycle in which case a part of the maximum stroke volume of the cylinder is displaced. Command signals are then issued by the control unit to actively control the electronically controlled valves of each of the working chambers to implement the selected net displacement. Thus, a "firing sequence" of active and idle strokes is implemented to meet the demand signal, for example in the manner disclosed in EP 0,361,927, EP 0,494,236 or EP 1,537,333.

Thus, the operation of the fluid-working machine is determined in which active and idle strokes are interspersed to meet demand, responsive to the demand signal 115.

The fluid-working machine 100 is also operable to detect a fault in one or more working chambers based on received working chamber status data 119. Where a fault is detected, the subsequent firing sequence (and optionally the fluid routing) will be different to what it otherwise would have been. Should a fault occur in one of the working chambers, acoustic data indicative of a working chamber fault is received from the acoustic sensor of the working chamber in question by the control unit. The working chamber availability data on the database is updated to list the faulty working chamber as unavailable. The amended working chamber availability data is taken into account at subsequent decision points. The net effect is that in the subsequent firing sequence active cycles of the faulty working chamber which would otherwise have been selected are instead substituted with idle cycles, and idle cycles of one or more available working chambers are instead substituted with active cycles, such that the average output of the fluid working machine over time remains unchanged from before the fault occurred.

Figure 5:
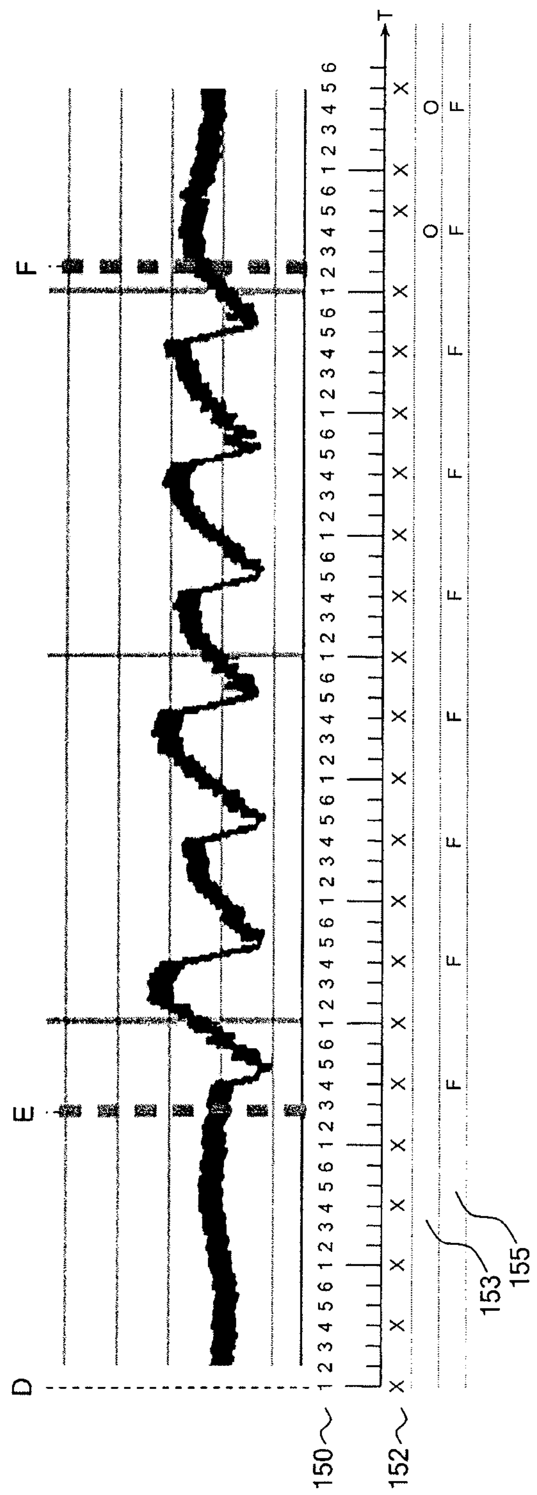
FIG. 5 shows a graph of the fluid line pressure at an output line, working chamber availability and firing sequence as a function of time, of the fluid-working machine of FIG. 3.

FIG. 5 is a schematic diagram of a firing sequence for the fluid-working machine 100, routed such that all six working chambers pump fluid in parallel and the combined displaced fluid from them is output through a port to a single fluid line. Line 150 represents the time, along axis T, at which working chambers 201, 202, 203, 204, 205 and 206 (designated, respectively, 1, 2, 3, 4, 5 and 6, in FIGS. 5 and 6) reach bottom dead centre. Line 152 represents the command signals issued by the controller to the electronically controlled valves of respective working chambers, where the symbol "X" indicates a control signal to cause the working chamber to execute an active pump cycle.

Figure 1:
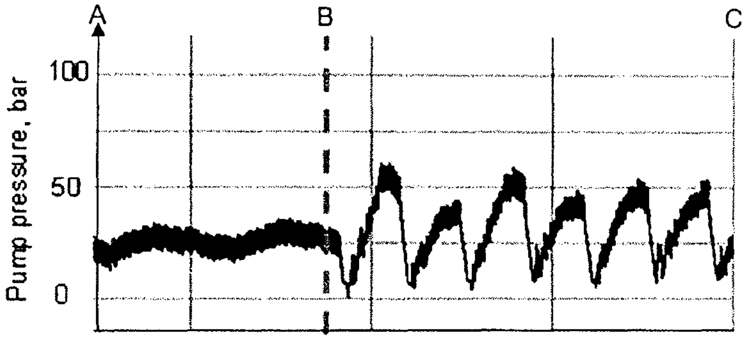
FIG. 1 shows a graph of the fluid line pressure as a function of time at an output fluid line of a fluid-working machine.

Between time D and time E, the fluid-working machine functions at ⅓ capacity, utilizing a firing sequence with a repeating pattern of three successive working chambers. At time E, a fault in chamber 204 was simulated by disconnecting power to the electronically controlled valves of working chamber 204 (as indicated by the symbol "F" in line 155). Thus, fluid pressure oscillates, in the manner described above in relation to FIG. 1, as the fluid-working machine attempts to meet the demand signal utilizing working chamber 204.

Between times E and F, working chamber availability data 119 received by the control unit indicates that working chamber 204 is not executing an active pump cycle.

At time F, the database is updated (as indicated by the symbol "O" in line 153) to reflect the unavailability of working chamber 204. As result, working chamber 205 carries out an active cycle, instead of an idle cycle, and command signals are no longer issued to unavailable working chamber 204. In this way the fluid working machine has selected the volume of working fluid displaced by a working chamber (205) taking into account the availability of other said working chambers (204) to displace fluid to carry out the working function.

In the resulting firing sequence each active pumping cycle of working chamber 204 is replaced by an active cycle of working chamber 205 (which would otherwise execute an idle cycle). Thus, averaged over a full rotation of the crankshaft, the net volume of fluid pumped is equal to the volume of fluid pumped between times D and E.

Accordingly, from time F onwards, the fluid output pressure fluctuations subside and the output pressure again approaches the demand signal.

In alternative embodiments, faults in working chambers are detected, or detectable, by other methods, to update the working chamber availability data. For example, the measured fluid pressure, or fluid flow rate, during and shortly after a working chamber is commanded to displace a volume of working fluid may be compared with the values which would be expected if the working chamber is working correctly (for example compared to a predictive model executed by the controller), which model may include parts of a fluid working system. In some embodiments, fluid pressure (or flow rate) sensors are positioned in the fluid lines intermediate the accumulators and the high pressure manifold, or alternatively one or more pressure sensors (and in some embodiments a pressure sensor and/or flow rate sensor corresponding to each working chamber) are positioned in the high pressure manifold(s). In some embodiments, the variability, or rate of variation, of fluid pressure or flow (of an output of the fluid working-machine) or crankshaft speed or torque are measured to detect a fault, for example the difference between the maximum and minimum values within a certain length of time, or the difference between an expected value and a measured value. Typically, vibration of the fluid-working machine is characteristic of active cycles, idle cycles and malfunctions in one or more working chambers, and the fluid-working machine may alternatively, or in addition, be equipped with accelerometers for detecting vibration (such that the working chamber status data comprises vibration related data).

Detection of faults in electric circuitry, connections and solenoids is known and faults in working chambers, and in particular the electronically controllable values, may be detected by monitoring the electric circuitry controlling the electronic valves (for example by continually monitoring the current and/or voltage trace or average) of signals issued to and received from the electronically controlled valves and comparing this with the trace or average expected if the valves and the working chambers with which they are associated are functioning correctly). Typically the current in an electromagnetically operated valve rises when a valve control signal is applied, falls when a valve control signal is removed, or changes when the valve begins or completes a movement. The rate of the rise or fall of current or relative location of inflexion points is indicative of the operative state of the valve.

In some embodiments, fault detection measurements may be taken over a number of cycles of working chamber volume, in order to increase detection reliability. The method may be particularly effective at increasing detection reliability based upon data received from one or more sensors associated with a group of working chambers (such as data received from a sensor associated with a particular fluid pathway, or current sensors associated with one or more electronically controlled values, or changeover valves, or the output of the fluid-working machine as a whole).

In some embodiments, the controller comprises a fault detection unit (which may be software running on the processor) operable to continuously monitor feedback from the fluid working machine (for example, fluid output pressure or crankshaft speed/phase, or current, or voltage).

Fault detection may be executed periodically, only in the event that the fluid output could not be adequately matched to the demand signal or signals, only executed under certain operating conditions, or only executed responsive to a user input. Alternatively, or in addition, fault detection may be deactivated or reactivated under certain operating conditions or responsive to a user input.

Operation of fault detection means which necessitate perturbations in the function of one or more working chambers may be unsafe, or unsatisfactory, in certain circumstances and deactivation or prevention of fault detection means under such circumstances is necessary in order to ensure a safe or satisfactory operation. For example, the fault detection means may be configured to operate only when the shaft is stationary, when the fluid working machine is fluidically isolated from at least some work functions, when work functions have reached a certain condition such as an end stop, when a brake is applied, or when the fluid working machine is not operating at maximum capacity, and configured so as not to operate under any other conditions.

In some embodiments, fault detection is executed automatically on start up of the fluid working machine, providing a "self check" of the fluid-working machine before it begins normal operation.

The method of fault detection may comprise commanding the controller to alter the valve control signals and comparing expected and measured output of the fluid working machine (or working chamber or chambers, as the case may be). Valve control signals may be lengthened, shortened, applied in a different phase relative to the cycles of working chamber volume, or be provided with a Pulse Width Modulation characteristic, in order to detect a fault.

Fault detection may comprise commanding the controller to execute a fault confirmation procedure in which the pattern of working chambers undergoing active cycles is changed (but not the expected average output of the fluid-working machine). Alternatively, a fault confirmation procedure may disable working chambers in turn (for example, by treating each working chamber as unavailable) and determine whether the symptom (or symptoms) of a fault (e.g. a failure to meet a demand signal, or an oscillating fluid output pressure) is or are thereby eliminated, or preferentially activate working chambers in turn and determine whether the or each said symptom of a fault is thereby exacerbated.

The fluid working machine 100 is also operable to meet two work functions concurrently in response to two demand signals.

Figure 6:
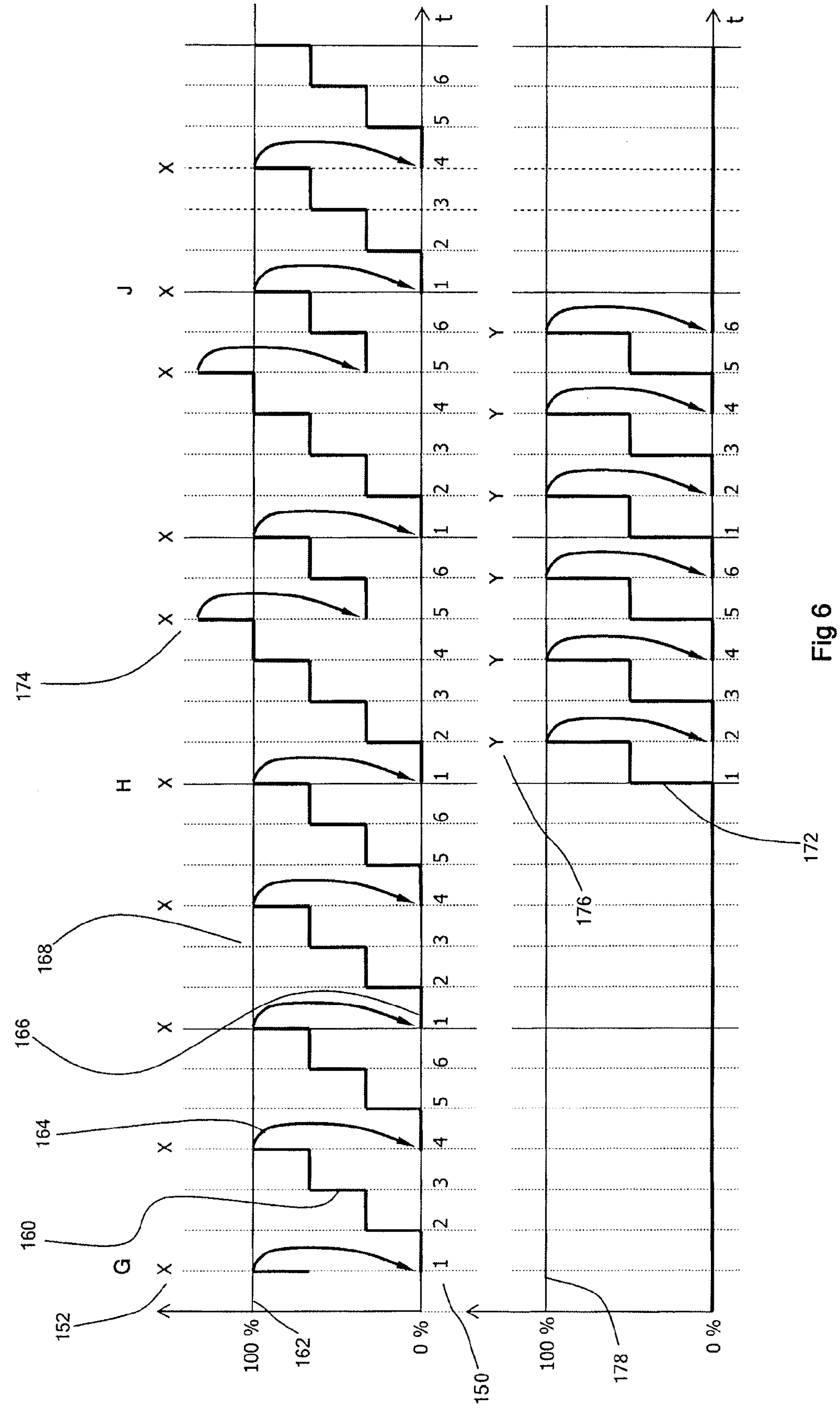
FIG. 6 is a schematic diagram of a firing sequence for the fluid-working machine of FIG. 3, operating in response to two demand signals.

FIG. 6 is a schematic diagram of a firing sequence for the fluid-working machine of FIG. 3. Line 150 represents the time, along axis T, at which working chambers 201, 202, 203, 204, 205 and 206 (designated, respectively, 1, 2, 3, 4, 5 and 6) reach bottom dead centre.

Between times G and H, the fluid-working machine operates in response to a single demand signal, again pumping at ⅓ capacity, with the fluid routed through the high pressure manifold to fluid line 124 from all six working chambers. Row 152 represents the command signals issued by the controller to the electronically controlled valves of respective working chambers, where the symbol "X" indicates a control signal to cause the working chamber to execute an active pump cycle.

A register value 160, which is a calculation of integrated demand (calculated from the demand signal) minus supply (calculated from the volume of fluid displaced during executed active cycles), is maintained by the control unit. The register value is updated periodically, typically incrementing at the beginning of each time step (where a time step corresponds to the difference between the times at which successive working chambers reach bottom dead centre) and decrementing at the end of each time step in which there is a decision to initiate an active cycle of a working chamber.

In alternative embodiments, for fluid working machines having working chambers operable to execute part-active cycles, the calculation of the register value takes into account the amount of fluid displaced during each part-active cycle. In some embodiments the time step is not equal to the difference between the times at which successive working chambers reach bottom dead centre.

At each time step the register value increments by the instantaneous displacement demand (calculated from demand signal 113, with appropriate scaling). When the register reaches or exceeds the threshold value 162 (which is shown as a percentage of the volume of working chamber volume in FIG. 6) the controller 112 will cause the next working chamber to execute an active cycle (shown by the symbol "X" in line 152). The register value is then reduced by an amount 164 corresponding to the volume of fluid which has been displaced (i.e. by 100% of the threshold value in the present example).

At a lower value of the demand signal, the register value will increment more slowly and at a higher value of the demand signal, the register value will increment more rapidly. However if, at a given time step, the register value is at or above the threshold value, an active cycle will be executed. Thus, the register value is effectively an integral of as yet unmet demand.

In this way any required flow can be produced from a sequence of working chamber activations.

At time H, a second demand signal is received by the controller to pump fluid through outlet 126 at ½ capacity (a second work function). The control unit updates the database, based on received working chamber availability data, to record that working chambers 201, 203 and 205 are available to meet the first demand signal, but unavailable to meet the second demand signal, and working chambers 202, 204 and 206 are available to meet the second demand signal but unavailable to meet the first demand signal. In addition, new routing signals 118 are issued such that the fluid is re-routed through the high pressure manifold such that the high pressure manifold 120 communicating with working chambers 202, 204 and 206 is isolated from the high pressure line 124 and instead communicates with line 126.

A second register value 172, for comparison to a second threshold value 178 is held by the controller, in response to receipt of the second demand signal and is updated at each time step in the same manner as register value 160.

Using the working chamber availability data, the controller permits register value 160 to exceed the threshold value for two successive time steps (as shown by numeral 174). An active cycle of working chamber 204 is not executed to meet the first demand signal and is substituted by an active cycle of working chamber 205 at the following time step. In this way, the fluid working machine has selected the volume of working fluid displaced by a working chamber taking into account the availability of the working chamber to displace fluid to carry out the working function.

In a similar manner as discussed above in relation to the first demand signal between times G and H, active cycles (indicated by the symbol "Y" in line 176) of working chambers 202, 204 and 206 are executed in order to meet the second demand signal each time that the second register value reaches the second threshold value.

Thus, averaged over a full rotation of the crankshaft, the net volume of fluid pumped to both lines 124,126 fulfils the two demand signals.

At time J, the second demand signal is removed, the working chamber database is updated, and the fluid-working machine reverts to the configuration of times G to H.

The fluid-working machine would also be able to function so as to meet the remaining demand signal without reconfiguration at time J, and to continue to execute active cycles of working chambers 201 and 203. However, the oscillations in the output flow so produced would be greater than those produced between times G and H, due to the irregular repetition frequency. The controller updates the working chamber database to register all working chambers as available to meet the first demand signal and to update the configuration of manifolds 120,121 (thereby selecting the volume of working fluid displaced by each working chamber taking into account the availability of other working chambers), to provide the most even distribution of pumping cycles of the fluid-working machine.

These examples provide a better response to a working chamber becoming unavailable than fluid working machines using known working chamber volume selection means in which a register value is maintained which represents the integral of demand minus supply of fluid and where a working chamber is activated to supply or receive fluid to meet a working function when, and in some embodiments only when, the register value exceeds the maximum stroke volume of the working chamber, assuming that the chamber is functioning correctly.

In some embodiments of the invention, instead of storing data indicative of whether each working chamber is available, the database may be periodically updated by deleting working chamber data 146 of one or more working chambers from the database when a working chamber is found to be unavailable, and adding to the database in order to reactivate the said working chambers. The database may be stored in whole or in part in RAM (or other memory) within the controller and may be distributed.

Figure 7:
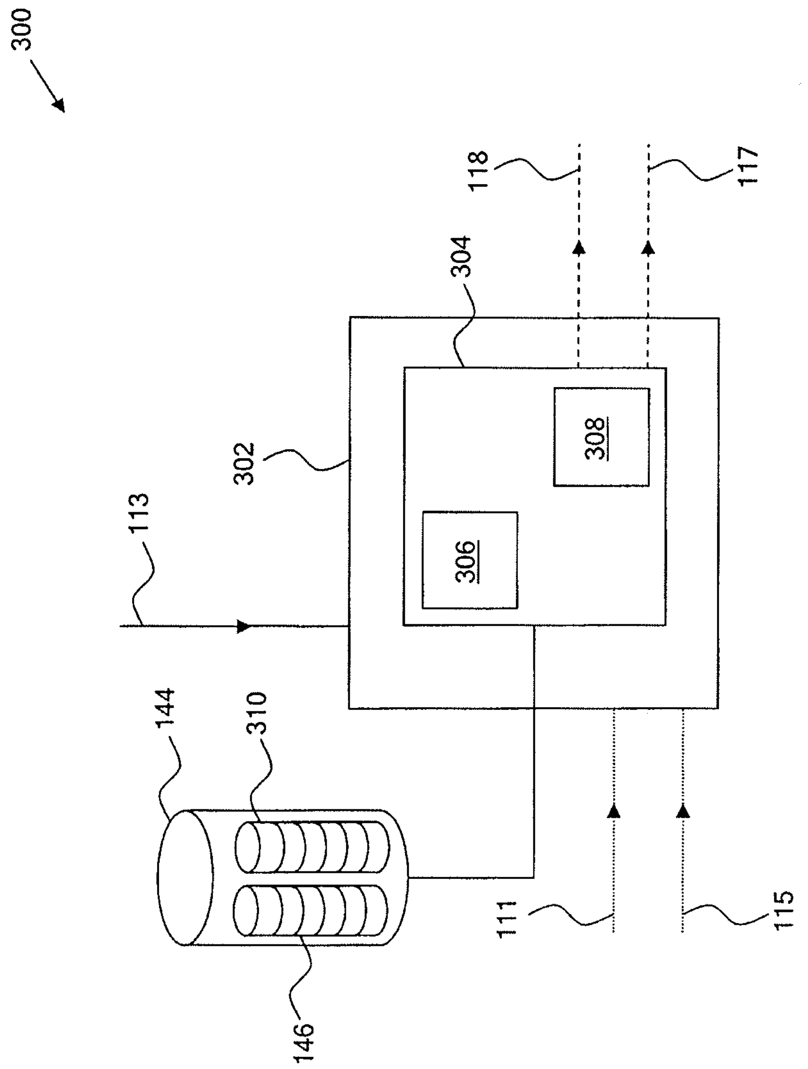
FIG. 7 shows a schematic diagram of a further embodiment of a controller for the fluid working machine of FIG. 3.

FIG. 7 shows a schematic diagram of a further embodiment of a controller 300 for the fluid-working machine of FIG. 3. The controller comprises a control unit 302 having a processor 304. The control unit communicates with a database 144, in which is stored working chamber data 146 relating to each of the working chambers (201,202,203,204,205,206) and comprising the relative phase of the respective working chambers and working chamber availability data. The controller (at the control unit) receives a crankshaft position signal 111 from sensor 110, a fluid pressure signal or signals 115 (a measured output parameter of the fluid working machine), and a demand signal or signals 113, which are typically defined by the operator of the fluid working machine.

The control unit functions generally as described in relation to FIG. 4, and in use the processor generates command signals 117 selecting the volume displaced by each of the working chambers during each cycle of working chamber volume. When the fluid-working machine receives more than one demand signal, the processor is also operable to generate routing signals 118 to the changeover valves (issued by the control unit) in order to define fluid paths along which fluid is conducted between one or more loads and one or more working chambers.

The database further comprises stored working chamber command signal data 310, received from the processor, comprising data relating to command signals previously issued to each working chamber (and thus to the volume of working fluid previously selected to be displaced). Typically, data is stored for each working chamber for the preceding two to five cycles of working chamber volume.

The processor further comprises a predictor module 306, operable to output an expected value of the fluid pressure signal 115 (an output parameter of the fluid-working machine) to a comparator module 308, operable to compare each measured value against corresponding expected values. In the controller shown in FIG. 7, the predictor module and comparator module are software running on the processor.

Figure 8:
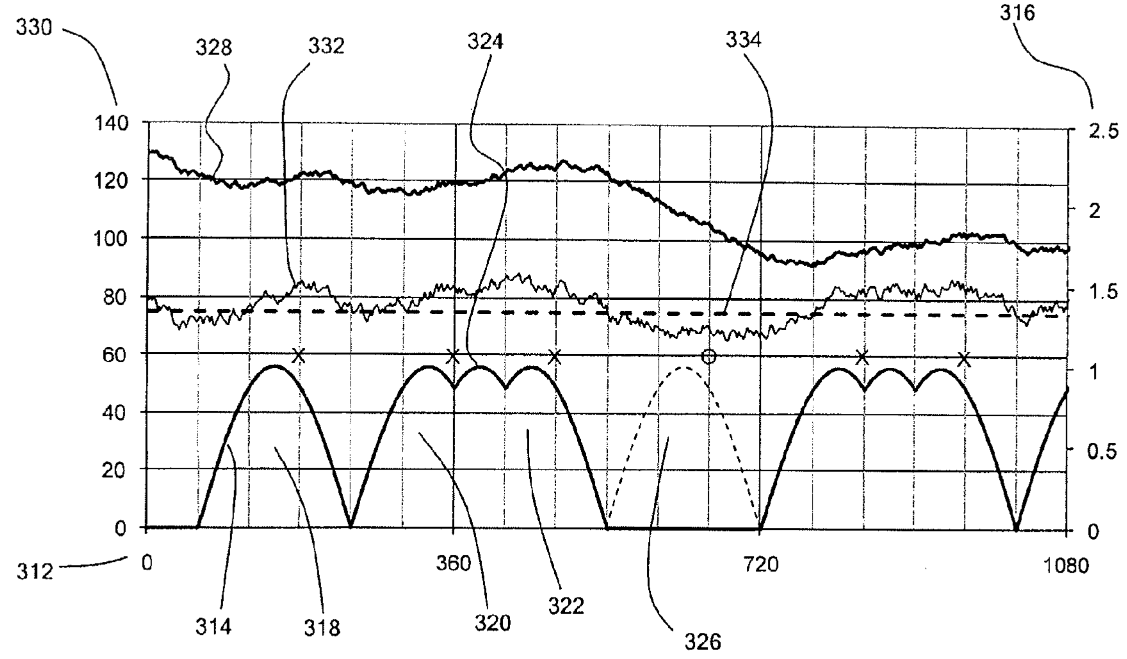
FIG. 8 shows a graph of the fluid line pressure at an output line, trend signal value and total working chamber fluid flow, as a function of crankshaft rotation angle, of the fluid-working machine of FIG. 3.

FIG. 8 plots several parameters against shaft angle 312 for three revolutions of the fluid working machine of FIG. 3. Total expected flow 314 from all working chambers is plotted on secondary ordinate 316 (on which the value 1 represents the maximum rate of fluid flow of one working chamber during an active cycle) for explanatory purposes.

When a functional working chamber is commanded to execute an active cycle, a flow pulse of working fluid is generated, which peaks 90 degrees of crankshaft rotation after the corresponding command is issued.

In the example shown, the fluid working machine undergoes a firing sequence of active and idle strokes which repeats every 480 degrees of crankshaft rotation.

Expected flow pulse 318 represents the expected fluid displaced by working chamber 203 during an active cycle. Working chamber 203 reaches bottom dead centre at 60 degrees and pumps fluid until 240 degrees. Subsequently, working chambers 206 and then 202 are commanded by the controller to execute active cycles. Expected flow pulse 320 represents the fluid expected to be displaced by working chamber 206 (pumping from 240 to 430 degrees) and expected flow pulse 322 represents the fluid expected to be displaced by working chamber 202 (pumping from 360 to 540 degrees). The intermediate peak 324 is due to the superposition of flow from these two working chambers. At 540 degrees working chamber 205 is commanded to activate but a fault causes it to fail to produce flow, represented by dashed portion 326 of the total expected flow. Operation continues with the activation of working chambers 202, 204 and 201, at 720 degrees and 840 degrees, and at 1020 degrees respectively. (The peak of the expected flow pulse from the active cycle of working chamber 201 is not shown).

Measured output pressure 328 (obtained from a fluid pressure signal 115, at an output of the fluid-working machine) is plotted against primary ordinate 330.

The processor applies a smoothing and differentiating algorithm to the measured output pressure, to create a trend signal 332 that has less noise than a signal obtained solely by differentiating the measured output pressure. The trend signal is offset by 80 pressure units in FIG. 8 to aid clarity. The trend signal is a measured value related to an output of the fluid-working machine.

When the trend is positive (above 80 in FIG. 8) the pressure is generally rising; when it is negative (below 80 in FIG. 8) the pressure is generally falling.

A threshold value 334 of the trend signal is determined experimentally or by analysis of the application.

In alternative embodiments, the threshold value may be variable, for example depending on working fluid pressure, average flow rate, temperature or age of the fluid-working machine.

At intervals of a time step, the controller samples the trend signal. The predictor module associates each sampled trend signal with working chamber command signal data issued by the processor 120 degrees of crankshaft rotation earlier.

The predictor module causes each sampled trend signal associated with a command signal 120 degrees of crankshaft rotation earlier for a working chamber to execute an idle cycle to be discarded, and for each sampled trend signal associated with a command signal for a working chamber to execute an active cycle to be output to the comparator module. If a command signal 120 degrees earlier was for a working chamber to undergo an active cycle, then the trend signal would be expected to be above the threshold value. Thus, the comparator compares each received sampled trend signal to the threshold value, in order to determine the acceptability of the trend signal.

When a sampled trend signal value is above the threshold value, the processor determines that the associated working chamber is working (indicated by the symbol "X" in FIG. 8). When a sampled trend signal value is not above the threshold value the processor determines that there is a possible fault with the associated working chamber (indicated by the symbol "O"). In the example shown, at 660 degrees, the comparator module compares the sampled trend signal value against the threshold value and, since the trend signal value is below the threshold value, and is therefore unacceptable and a possible fault associated with working chamber 205 is identified. Whether the sampled trend signal value is above the threshold value is an example of an acceptable function criteria. One skilled in the art will appreciate that many alternative criteria could be used as acceptable function criteria and that other properties of measured output valves could be tested against acceptable function criteria.

In some embodiments, the comparator and predictor modules may associate trend signal values with working chamber command signal data issued by the processor more than 120 degrees, or less than 120 degrees of crankshaft rotation earlier and/or earlier by a non-integer number of time steps. For example, the elapsed angle of crankshaft rotation between the trend signal value and the associated working chamber command signal data may vary if the fluid working machine is operable to produce part active cycles.

In some embodiments, the possible fault must be detected several times, or several times within a certain period of time, or above a certain rate or frequency before the controller confirms that there is a fault associated with a working chamber or chambers, because the said working chambers are treated as unavailable (and the database and subsequent firing sequence amended accordingly). For example, in some embodiments, the processor outputs the comparison between all and only those sampled trend signals associated with active or part active cycles of each said working chamber to the working chamber database, and is operable to periodically analyse the stored, compared trend data associated with each of the working chambers (which might, for example be stored for two, or five, or more active or part active cycles of working chamber volume) in order to determine faults in a working chamber, or in several working chambers (which might be indicative that a fault has occurred elsewhere in the fluid-working machine). The measurement of the output parameter is thus responsive to the previously selected net displacement of working fluid. By this method, trends in the performance of each working chamber may be analysed, for example the development of a fault such as a leaking valve or seal, and required maintenance may be identified before a more serious failure develops.

In alternative embodiments, the predictor module associates each sampled trend signal with working chamber command signal data issued by the processor 120 degrees of crankshaft rotation earlier and outputs all the data to the comparator module, and the comparator module is operable to compare data associated with an active (or part active) cycle with the threshold value, but not to compare data associated with an idle cycle with the threshold value.

In some embodiments, displacement of fluid which has not been commanded by the controller may be detected or detectable by the method of the invention. For example, the method may comprise detecting when an active low or high pressure valve is closing or has closed, or is opening or has opened without a command to do so, and thus causing the displacement of working fluid by one or more of the working chambers which has not been commanded by the controller, in order to meet a demand signal of a working function. Thus, electronic (or other) signals received by sensors associated with the said electronically controllable valves may not fulfil an acceptable function criterion. Alternatively, or in addition, the method may comprise detecting that a measured output parameter of the fluid working machine is indicative of fluid displacement which has not been commanded by the controller, for example a greater than expected measured output pressure, or trend value.

The fault detection method may not be reliable in some applications and for certain operating conditions. Thus there may be operating conditions which are not suitable for detecting faults, due to a risk of false positives or false negatives. In a particularly favourable embodiment for some systems, especially those with one or more large capacity compliant circuits between one or more said working chambers and a fluid load and the amount of energy stored within the one or more said compliant circuits is close to the maximum capacity, or to zero, the fault detection method may be prevented or inhibited when the amount of hydraulic energy stored by a said compliant circuit is unsuitable.

The fault detection method may be inhibited or prevented when the working chambers available to carry out a working function are operating above a certain proportion of the time, i.e. if the working chambers allocated to a working function (which may be all of the working chambers) are operating at or close to maximum capacity in order to meet a demand signal, or are above a predetermined threshold of maximum capacity. The fault detection method may be inhibited or prevented when more than one working chamber is simultaneously contributing to the net displacement of working fluid between a certain high and low pressure manifold. The operating condition of the fluid working machine may be unsuitable for carrying out the fault detection method if the received demand signal is above a fault detection threshold, for example 15% or 32% of the maximum possible rate of displacement of the working chambers available to carry out a working function. It may be advantageous to inhibit a fault detection method comprising measurement of the current through an electromagnetic actuated valve, when more than one electromagnet is activated contemporaneously, to ease determining whether the measured current fulfils the acceptable function criterion.

Whereas an example has been described with respect to measuring output parameters related to fluid pressure in (or related to) a high pressure manifold, in some embodiments, measurement of an output parameter related to fluid pressure in (or related to) a low pressure manifold may be advantageous because the magnitude of pressure variations may be proportionally greater and thus the method of fault detection may more sensitive.

In some embodiments, a measured output parameter of the fluid working machine which is responsive to the displacement of working fluid may be a parameter associated with fluid entering a working chamber from the or a low pressure manifold, to be subsequently displaced by the working chamber (to the high or low pressure manifold) responsive to a received demand signal. In some embodiments, a parameter may be associated with both a fluid input and a fluid output.

The measured output parameter (e.g. pressure measurement) is preferably made close to the working chambers, and the controller may be able to compensate for time delay (i.e. phase relationship) caused by the propagation of fluid pressure through the manifolds. The compensation may be variable with operating conditions such as pressure, temperature and shaft speed, including accounting for non-linear compressibility of fluid and non-linear superposition of the fluid pulses.

Figure 9:
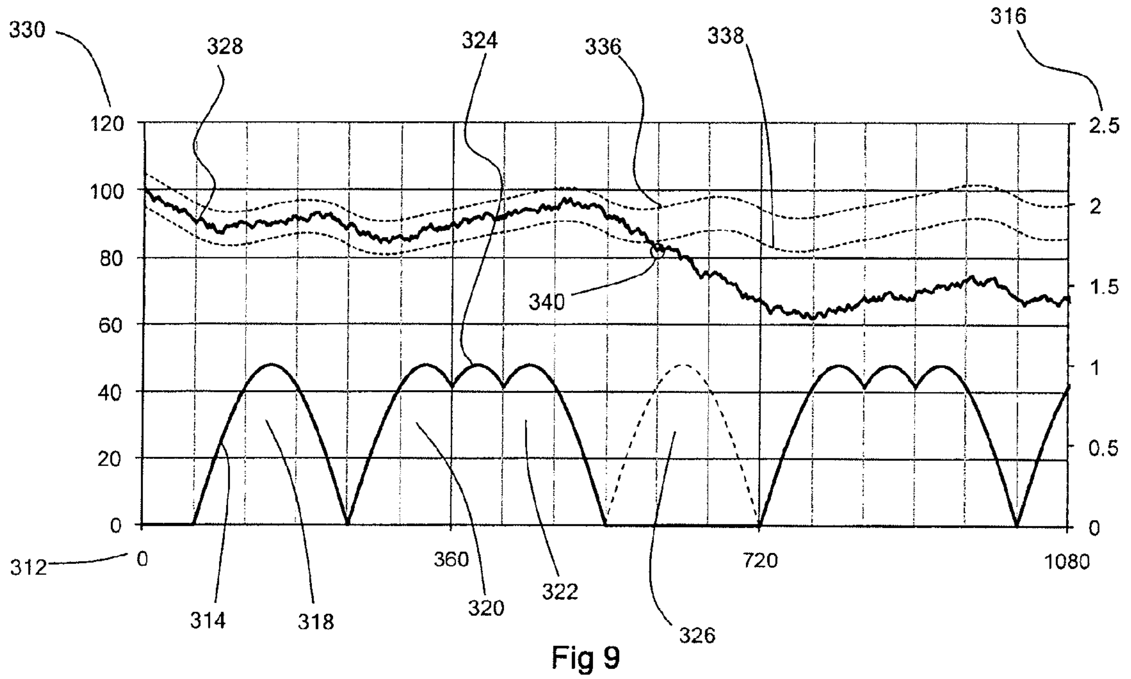
FIG. 9 shows a graph of the fluid line pressure at an output line, trend signal value and upper and lower thresholds of the expected trend signal value and total working chamber fluid flow, as a function of crankshaft rotation angle, of the fluid-working machine of FIG. 3.

A further embodiment of the invention is shown in FIG. 9. The operation of the fluid working machine proceeds as discussed above, in relation to FIG. 8. In the example of FIG. 9, the predictor module determines total expected flow 314 from all working chambers (using stored working chamber command signal data) and, using the known drain of fluid from the high pressure manifold to a work function, the predictor module determines expected output pressure and, from this, an upper boundary 336 and a lower boundary 338 of the acceptable range of expected output pressure.

Measured output pressure and the upper and lower boundaries of the acceptable range of expected output pressure are plotted against the primary ordinate 330 of FIG. 9. Whether the output pressure falls between the upper and lower boundaries is another example of acceptable function criteria.

The comparator module is operable to detect at periodic intervals whether the measured output pressure lies outside of the upper or lower boundaries. In the example shown in FIG. 9, the measured output pressure falls below the lower boundary at point 340 and a possible fault is identified, as represented by the symbol "O". As the phase relationship between the measurement points and working chamber command signal data is known (in the present example, 60 degrees) the possible fault may be associated with working chamber 205.

In some embodiments, the phase relationship may be greater or less than 60 degrees. In some embodiments, a possible fault must be detected several times, or several times within a certain period of time, or above a certain rate or frequency before the controller confirms that there is a fault associated with a working chamber or chambers (for example if the phase relationship is such that a single potential fault may be associated with a number of working chambers or a number of different groups of working chambers).

Upper or lower boundaries may be a fixed or variable difference from the expected pressure. The expected pressure may include some feedback of actual pressure from a pressure transducer, for example to correct for inaccuracies in the model parameters such as leakage and fluid compressibility. The model may incorporate machine learning algorithms that update its parameters based on observations, for example to learn the compliance or fluid impedance of the fluid system or the fluid working machine.

Figures 10, 11:
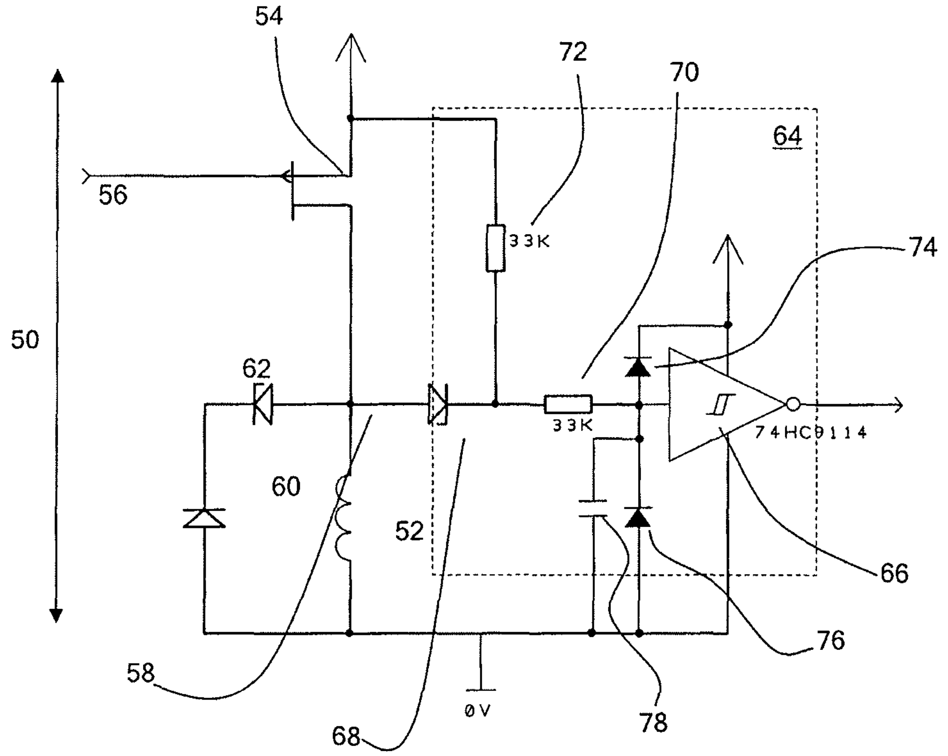
FIG. 10 shows circuit diagram of a valve monitoring device for monitoring an actuated valve comprising an electromagnetic coil.
FIG. 11 shows a table representation of a data store for use in a particular embodiment of the fault detection method.

FIG. 10 is a circuit diagram of a valve monitoring circuit for monitoring an actuated valve comprising an electromagnetic coil, in this example also incorporating an amplifier 54 for driving more current into the coil than the controller would otherwise be capable of supplying. 12V power supply 50 is connected across coil 52 via a P-channel FET (Field-Effect Transistor) 54 (acting as the amplifier), the FET being under the control of the controller 12 (FIG. 2) via an interface circuit (not shown) connected at 56 and also connected to a sensed junction 58. A flywheel diode 60 and optional current-damping zener diode 62 in series provide a parallel current path around the coil. A valve monitoring circuit is shown generally at 64 and comprises an inverting Schmitt trigger buffer 66 driven by a level shifting zener 68 connected to the coil and FET node and biased by bias resistor 72, protected by protection resistor 70. A Schmitt trigger is a comparator circuit with hysteresis. The Schmitt trigger output signal is referenced to supply rails suitable for connection to the controller, and diodes 74, 76 (which may be internal to the Schmitt trigger device) protect the Schmitt trigger. An optional capacitor 78 between the Schmitt trigger input and the protection resister acts (in conjunction with the protection resistor) as a low pass filter, and is useful in the event that noise (for example PWM (Pulse Wave Modulation) noise) is expected. The controller 12 is connected to the Schmitt trigger to measure the time, phase (with respect to shaft 8 rotation) and length of the circuit's output.

In operation, the sensed junction sits at 0V and the bias resistor draws the Schmitt trigger's input to the level-shifting zener diode's value of 3V, driving the Schmitt trigger's output low. When the controller activates the FET to close or open the associated valve the sensed junction is at 12V, but the protection resistor protects the Schmitt trigger from damage and its output is still low. When the controller removes the activating signal, the sensed junction voltage falls to around −21V due to the flywheel diode and current-clamping zener diode and the inductive property of the coil. The protection resistor protects the Schmitt trigger from the −18V signal it will see after the level-shifting zener, but the Schmitt trigger now outputs a high signal. After the inductive energy dissipates, the Schmitt trigger output returns to a low value. However, if the valve begins to move then the motion will produce through inductive effects a voltage across the coil, and hence a negative voltage at the sensed junction. The Schmitt trigger produces a high output which the controller can detect and/or measure, thus to detect the time, speed or presence of valve movement. The inductive voltage generated by the coil may be due to some permanent magnetism of the valve materials or some residual current circulating in the coil due to bias resistor 72.

By virtue of the above circuit, the controller is able to receive a signal indicating when and/or whether the HPV (High Pressure Valve) or LPV (Low Pressure Valve) has reopened (a measured output parameter which is responsive to displacement of working fluid), to compare the signal to a required length, phase or time delay (an acceptable function criterion) and, after taking into account the previously selected net displacement of working fluid, to infer whether there is a fault in the fluid-working machine (e.g. a valve or working chamber of the fluid working machine). After a pumping cycle the LPV should reopen shortly after TDC (Top Dead Center), after a motoring cycle it should open shortly before BDC (Bottom Dead Center), and after a pumping or motoring cycle the HPV should open shortly after the LPV closes. The HPV or LPV opening at different times to these or not at all indicates a fault, with the fault being identifiable from the detected opening time or phase, or lack of detection. For example, if the LPV does not reopen, it may be because it never closed, or because it is stuck closed, or because the HPV has stuck open. Further tests, including a fault confirmation procedure, can determine the exact cause of the fault.

It will be appreciated that valve monitoring devices could be implemented in numerous ways including being integral to the valve, or physically separate and in wired communication with the valve solenoid. Other mechanisms of detecting the valve movement will present themselves to those skilled in the art, for example applying an exciting AC signal or pulses to the coil and detecting the change in inductance of the coil 52 as the valve moves, or incorporating a series or parallel capacitor to create an LC (including an inductor (L as the symbol of inductance) and a capacitor (C as the symbol of capacitance)) circuit the resonant frequency and Q of which change with valve position.

The controller may need to reject or otherwise not act responsive to some high or low signals that it receives (or fails to receive, when expected) from the sensor. For example, voltage changes on either end of the coil 52 can cause false readings, including detecting valve movement when none has occurred and failing to detect valve movement when it has occurred. The controller therefore is preferably operable to reject or otherwise not act responsive to signals which are received at unexpected times, or which are correlated with other events known to interfere with the correct and accurate measurement of valve movement. For example, the activation of other coils of a fluid working machine sharing a common 0V line with the coil 52 can raise the voltage at sensed junction 58. Thus, if the other coil is activated simultaneous to the movement of coil 52, the sensor may fail to detect the movement of coil 52 since the voltage at sensed junction 58 will not drop sufficiently low.

In some operating conditions, the measured output parameter strongly depends on the previously displaced fluid from more than one working chamber, and the method may comprise taking into account the fluid displaced by more than one previous working chamber, when detecting a fault in a said working chamber.

FIG. 11 is a data store, recorded during normal operation of a fluid working machine, in which working chambers 201, 204, 205 and 206 (and possibly 202 and 203) are available to meet a demand signal, for use with a method of taking into account the previously selected net displacement of working fluid by more than one working chamber. A fault in working chamber 201 of fluid working machine 100 is detected, taking into account the previously selected displacement of fluid by the three preceding working chambers 204, 205 and 206. In FIG. 11, the numeral "1" represents a record of the selection by the controller of an active cycle of the respective working chamber and the numeral "0" represents a record of the selection of an idle cycle. When sampling the trend data 332 or the estimated output parameter 328 at a time appropriate to detect faults with working chamber 201 (typically at a time corresponding to 90 degrees of further crankshaft rotation), the controller stores or accumulates the sampled trend signal or comparator output (or, in alternative embodiments, another output parameter) into the appropriate cell under column ΔP. In FIG. 11, xn (n=1, 2, 3 . . . ) and yn (n=1, 2, 3 . . . ) values are measured trend signal values following commands issued by the controller to execute idle and active cycles of working chamber 201, respectively.

Trend signal value y3 corresponds to the controller having issued commands for an earlier active cycle of working chamber 201, following commands for working chambers 204 and 206 to execute idle cycles and working chamber 205 to execute an active cycle. Similarly, trend signal valve y2 is recorded following a command issued for an active cycle of working chamber 201, following commands for earlier idle cycles of working chambers 204 and 205, and an active cycle of working chamber 206. Corresponding trend values x3 and x2 are recorded following commands issued by the controller for working chamber 201 to execute idle cycles, following analogous sequences of active and idle cycles of working chambers 204, 205 and 206.

The method of diagnosing whether there is a fault in chamber 201 comprises comparing (by the controller) y3 with x3 (which differ only in the activation of the working chamber 201 being assessed) and/or y2 with x2 (but not y2 with x3 or y3 with x2, or more generally not yn with xm where m≠n) to determine if the relative trend between y3 and x3 is as expected if working chamber 201 is functioning normally. For example, typically, if working chamber 201 is operating correctly, y3 would have a higher trend value x3, whereas if working chamber 201 has a fault y3 and x3 would be very similar. It is possible that some patterns of preceding working chamber activation might not give reliable fault detection, and the controller may be configured not to compare one or more of xN and yN (where N∈[1 . . 8]). For example, in some embodiments, the controller may be configured to not compare x2 with y2, nor x4 with y4, nor x6 with y6, nor x8 with y8, because the effect of working chamber 206 (which is always activated before 201 for these combinations) causes the fault detection on working chamber 201 to be unreliable. In some systems the ignored combinations may be related to the total flow, for example the controller may be configured not to compare x7 with y7 nor x8 with y8, because the flow rate is too high for reliable detection.

Thus, the method taking into account the fluid previously displaced from more than one working chamber may enable the detection of a fault under a wider range of conditions, for example where a trend signal (or a comparison value) has not (or has not yet) fallen below a threshold value (i.e. where both xN and yN are above the threshold value). Thus, the method taking into account the fluid previously displaced from more than one working chamber means that the acceptable function criterion judges the effect on output parameters of the fluid working machine due to the working chamber being assessed for a fault being active, against that working chamber being idle, with the system state before the activation (or idling) of the working chamber being otherwise substantially the same.

The advantage, for some operating conditions, of considering the selected displacement of working chambers other than the one being assessed for a fault, compared to the method described with respect to FIGS. 8 and 9 in which the acceptable function criterion did not take into account the selected displacement of working chambers other than the working chamber being assessed for a fault, is that due to fluid-working system dynamics it is possible to eliminate (or substantially reduce) the effect of earlier active cycles of other working chambers which might otherwise interfere with the measured trend or comparison values, in relation to the working chamber being assessed for a fault.

In particular, the algorithms which select which working chambers to activate and how much fluid they displace cause the activation pattern preceding the activation of any given working chamber to be non-random. Thus, because the effects of a working chamber activation persist for longer than the interval between adjacent working chambers reaching Top Dead Centre, there is a consistent non-random effect on the measured trend of any particular working chamber being assessed for a fault (caused by the preceding working chambers), regardless of whether that working chamber being assessed for a fault is used or not. The non-random effects will likely vary with different operating conditions (e.g. pressures), and so the trends or comparisons which constitute an acceptable function criterion would also have to change with different operating conditions. But, as such operating condition-sensitive acceptable function criteria are difficult to devise reliably ahead of time, the method just described, which accounts for the previously selected displacement by working chambers other than the one being assessed for a fault, is necessary in some circumstances, in order to reliably determine whether there is a fault, and may therefore also enable the method of fault detection to be reliably conducted over a much wider range of operating conditions.

In an alternative embodiment, one or more additional prior operating conditions may be taken into account. For some fluid working machines, or in some conditions, the fluid pressure or crankshaft rotation speed may influence the measured trend or comparison, and so an additional prior operating condition may be that the working fluid pressure lies within a certain (possibly narrow) range and the speed lies within a certain (possibly narrow) range, and so the xN and yN trend or comparison valves to be compared are generated from identical patterns of idle/active cycles of preceding working chambers, in which the other prior operating conditions were also the same (or within the said ranges) when each respective active/idle cycle was executed. For example, a data store corresponding to the data store shown in FIG. 11 would comprise additional binary data associated with each additional prior operating condition (i.e. '1's in each of two additional columns associated with each working chamber (201, 204, 205, 206) would indicate that the pressure and speed respectively were within their ranges, and '0's would indicate that they were not). Similarly, N, the number of rows of the data store would be higher (four times higher in this example, to reflect combinations of both sequences of idle/active cycles, and sequences of in range/out or range values of the prior operating conditions of speed and fluid pressure). Therefore, accumulated trends valves xm and ym to be compared, would relate to identical sequences of pressure and speed ranges as well as a certain combination of preceding working chamber activations. Accordingly, fault detection may be made more reliably than (for example) by comparing an xn value recorded at a low speed and/or pressure with a yn value recorded at a high speed and/or pressure. Again, certain values of m might be excluded from comparison on the basis that they may be unreliable.

Further variations and modification may be made within the scope of the invention herein disclosed.

The invention claimed is:

1. A method of detecting a fault in a fluid-working machine comprising a plurality of working chambers of cyclically varying volume, each said working chamber operable to displace a volume of a working fluid which is selectable by active control of one or more electronically controllable valves for each cycle of a working chamber volume to carry out a working function responsive to a received demand signal, the method comprising determining whether a measured output parameter of the fluid working machine which is responsive to the displacement of the working fluid by one or more of the working chambers to carry out the working function fulfils at least one acceptable function criterion, the method further comprising taking into account the previously selected net displacement of the working fluid by a working chamber of said plurality of working chambers by the active control of one or more electronically controllable valves during a cycle of working chamber volume to carry out the working function.

2. A method according to claim 1, wherein the step of determining whether the measured output parameter fulfils at least one acceptable function criterion is carried out a period of time after a selection of a net displacement of the working fluid by a working chamber of said plurality of working chambers during a specific cycle of working chamber volume.

3. A method according to claim 2, wherein the method comprises interspersing idle cycles in which no said net displacement of the working fluid by a working chamber is selected and active cycles in which the net displacement of the working fluid by the same working chamber is selected, wherein the step of determining whether the measured output parameter fulfils at least one acceptable function criterion is not carried out responsive to selection of no said net displacement of the working fluid by a working chamber.

4. A method according to claim 1, wherein the at least one acceptable function criterion depends on the volume of the working fluid previously selected to be displaced by one or more said working chambers to meet the working function.

5. A method according to claim 1, further comprising the step of comparing a property of the measured output parameter with an expected property of the measured output parameter which is determined taking into account the volume of the working fluid previously selected to be displaced by one or more said working chambers to carry out the working function.

6. A method according to claim 5, wherein the expected property of the measured output parameter is determined taking into account the volume of the working fluid previously selected to be displaced by a working chamber of said plurality of working chambers to carry out the working function during each of two consecutive cycles of working chamber volume.

7. A method according to claim 1, wherein the measurement of the measured output parameter of the fluid working machine is responsive to the previously selected net displacement of the working fluid by a working chamber during a cycle of working chamber volume to carry out the working function.

8. A method according to claim 1, wherein the at least one acceptable function criterion relates to the value of the measured output parameter, the rate of change of the measured output parameter, or fluctuations in the measured output parameter.

9. A method according to claim 1, further comprising determining whether a plurality of measured output parameters of the fluid working machine which are responsive to the displacement of the working fluid by one or more of the working chamber to carry out the working function fulfil at least one acceptable function criterion.

10. A method of detecting a fault in a fluid path in a fluid-working machine comprising a plurality of working chambers of cyclically varying volume, each said working chamber operable to displace a volume of the working fluid which is selectable by active control of one or more electronically controllable valves for each cycle of working chamber volume to carry out a working function responsive to a received demand signal, and one or more ports, one or more of which are associated with the working function, wherein the fluid-working machine is configurable to direct the working fluid along a fluid path selectable from amongst a group of different fluid paths to carry out the working function, each fluid path in the group of different fluid paths extending between one or more said ports and one or more working chambers, the method comprising detecting a fault in the fluid-working machine, wherein the detecting the fault in the fluid-working machine further comprises determining whether a measured output parameter of the fluid working machine which is responsive to the displacement of the working fluid by one or more of the working chambers to carry out the working function fulfils at least one acceptable function criterion, and taking into account the previously selected net displacement of the working fluid by a working chamber of said plurality of working chambers by the active control of one or more electronically controllable valves during a cycle of working chamber volume to carry out the working function.

11. A method according to claim 1, further comprising executing a fault confirmation procedure responsive to determining that one or more measured output parameters of the fluid working machine does not fulfil at least one acceptable function criterion and again determining whether the one or more measured output parameters fulfil at least one acceptable function criterion.

12. A method according to claim 11, wherein, during the fault confirmation procedure, the volume of the working fluid to be displaced by one or more said working chambers during a plurality of cycles of working chamber volume is selected so that a time averaged net displacement of the working fluid by one or more working chamber to meet a working function should not be different to the time averaged net displacement of the working fluid by the one or more working chambers which would have occurred had the fault conformation procedure not been executed, if each of the said one or more working chamber is functioning correctly.

13. A method according to claim 1, further comprising taking into account the previously selected net displacement of the working fluid by more than one working chamber, including at least one working chamber other than the working chamber being assessed for a fault.

14. A method according to claim 1, wherein a working chamber is treated as unavailable responsive to detection that there is a fault associated with the working chamber.

15. A method according to claim 14, further comprising selecting the volume of the working fluid displaced by one or more said working chambers during each cycle of working chamber volume to carry out the working function responsive to the received demand signal, and selecting the volume of the working fluid displaced by a working chamber during a cycle of working chamber volume taking into account the availability of other said working chambers to displace fluid to carry out the working function.

16. A fluid-working machine comprising a controller and a plurality of working chambers of cyclically varying volume, each said working chamber operable to displace a volume of a working fluid which is selectable by the controller on each cycle of a working chamber volume, the controller operable to select the volume of the working fluid displaced by one or more said working chambers on each cycle of working chamber volume by active control of one or more electronically controllable valves to carry out a working function responsive to a received demand signal, the fluid-working machine further comprising a fault detection module operable to determine whether a measured output parameter of the fluid working machine which is responsive to the displacement of the working fluid by one or more said working chambers to carry out the working function fulfils at least one acceptable function criterion by taking into account the previously selected net displacement of the working fluid by a working chamber by the active control of one or more electronically controllable valves during a cycle of working chamber volume to carry out the working function.

17. A fluid-working machine according to claim 16, wherein the fault detection module is operable to determine whether the measured output parameter of the fluid working machine fulfils at least one acceptable function criterion by taking into account the previously selected net displacement of the working fluid by more than one working chamber, including at least one working chamber other than the working chamber being assessed for a fault.

18. A fluid-working machine according to claim 16, wherein the controller is operable to receive the measured output parameter.

19. A fluid-working machine according to claim 16, wherein the controller is operable to receive one or more further measurements of the measured output parameters, from one or more sensors associated with an output of the fluid working machine.

20. A fluid-working machine according to claim 16, comprising one or more ports, wherein one or more of said one or more ports are associated with the working function, and the fluid-working machine is configurable to direct the working fluid along a fluid path selectable from amongst a group of different fluid paths to carry out the working function, each fluid path in the group of different fluid paths extending between one or more said ports and one or more said working chambers.

21. A fluid-working machine according to claim 20, further comprising one or more sensors located between each said port and one or more of the working chambers, operable to measure an output parameter of the fluid-working machine associated with one or more working chambers.

22. A fluid-working machine according to claim 16, wherein the controller comprises a non-transitory computer readable recording medium storing computer software configured to operate the fault detection module.

23. A method according to claim 12, wherein the fault confirmation procedure comprises disabling working chambers of said plurality of working chambers in turn and determining whether one or more symptoms of a fault are thereby eliminated.

24. A method according to claim 23, wherein working chambers of said plurality of working chambers are disabled in turn by treating the working chambers as unavailable in turn.

25. A method according to claim 23, wherein the fault confirmation procedure further comprises activating working chambers of said plurality of working chambers in turn and determining whether one or more symptoms of a fault are thereby exacerbated.

* * * * *